(12) United States Patent
Jones

(10) Patent No.: US 11,343,977 B1
(45) Date of Patent: May 31, 2022

(54) GREENHOUSE SHADING SYSTEM

(71) Applicant: Mikeal D. Jones, Henderson, CO (US)

(72) Inventor: Mikeal D. Jones, Henderson, CO (US)

( * ) Notice: Subject to any disclaimer, the term of this patent is extended or adjusted under 35 U.S.C. 154(b) by 0 days.

(21) Appl. No.: 17/397,751

(22) Filed: Aug. 9, 2021

(51) Int. Cl.
*A01G 9/14* (2006.01)
*A01G 9/16* (2006.01)
*E06B 9/17* (2006.01)
*E06B 9/70* (2006.01)

(52) U.S. Cl.
CPC ............ *A01G 9/16* (2013.01); *A01G 9/1438* (2013.01); *E06B 9/17061* (2013.01); *E06B 9/70* (2013.01)

(58) Field of Classification Search
CPC .......... A01G 9/025; A01G 9/033; A01G 9/14; A01G 9/143; A01G 9/1438; A01G 2009/1446; A01G 2009/1453; A01G 2009/1461; A01G 9/16; A01G 9/22; A01G 9/242; E06B 9/17061; E06B 9/70
USPC ............................................................ 47/17
See application file for complete search history.

(56) References Cited

U.S. PATENT DOCUMENTS

| | | |
|---|---|---|
| 711,225 A | 10/1902 | Putnam et al. |
| 1,106,624 A | 8/1914 | Cadwallader et al. |
| 2,193,921 A | 3/1940 | Gibbons |
| 2,827,138 A | 3/1958 | Roy |
| 3,295,763 A | 1/1967 | Shlomo |
| 3,481,073 A | 12/1969 | Yoshida et al. |
| 3,653,150 A | 4/1972 | Howard |
| 4,064,648 A | 12/1977 | Cary |
| 4,067,347 A | 1/1978 | Lipinski |
| 4,074,856 A | 2/1978 | Williams et al. |
| 4,244,146 A | 1/1981 | Kranz |
| 4,259,819 A | 4/1981 | Wemyss |
| 4,296,568 A | 10/1981 | Dukes |
| 4,387,533 A | 6/1983 | Green et al. |
| 4,462,390 A | 7/1984 | Holdridge et al. |
| 4,671,027 A | 6/1987 | Esposito |
| 4,723,714 A | 2/1988 | Lucas |
| 4,842,204 A | 6/1989 | Debruhl |
| 5,038,517 A * | 8/1991 | Talbott .................... A01G 9/242 47/17 |
| 5,438,794 A * | 8/1995 | Wi .......................... A01G 9/143 47/17 |
| 5,802,762 A | 9/1998 | Stonecypher |
| 6,182,737 B1 * | 2/2001 | Kuwabara .............. A01G 9/242 160/84.06 |
| 6,260,308 B1 | 7/2001 | Looney |
| 8,151,518 B2 | 4/2012 | Adams et al. |
| 9,212,503 B1 | 12/2015 | Mentch |
| 9,885,182 B1 | 2/2018 | Harkins |
| 10,006,197 B1 | 6/2018 | Harkins |
| 10,945,383 B2 | 3/2021 | Hesse |
| 2015/0164004 A1 * | 6/2015 | Kodama .................. A01G 9/14 47/17 |

(Continued)

*Primary Examiner* — William V Gilbert
(74) *Attorney, Agent, or Firm* — Stephen B. Katsaros; Patent Engineering, LLC

(57) ABSTRACT

Illustrative configurations of greenhouse shading systems are disclosed. One illustrative system includes a plurality of main trusses supporting a translucent material defining an interior space, a plurality of gantries; and a plurality of shades attached to the gantries and the main trusses. The main trusses, gantries, and shades cooperate to move the shades between a closed position and an open position thereby regulating the amount of light the entering interior space of the greenhouse.

20 Claims, 24 Drawing Sheets

(56) References Cited

U.S. PATENT DOCUMENTS

| | | | |
|---|---|---|---|
| 2015/0319936 A1* | 11/2015 | Park | A01G 9/143 47/17 |
| 2017/0231169 A1* | 8/2017 | Gillard | A01G 9/1415 47/17 |

* cited by examiner

GREENHOUSE SHADING SYSTEM

A portion of the disclosure of this patent document contains material, which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

TECHNICAL FIELD

This disclosure relates in general to a greenhouse and, but not by way of limitation, to a shading system for a greenhouse and associated devices and/or methods.

BACKGROUND

Plant cultivators may face problems while growing various plant varieties in particular seasons and terrains. For example, some plants may entail a warm and/or humid environment to sustain and grow, and therefore may yield less or completely fail in winter and/or locations with cold climates. Moreover, seasonal crops like some vegetables and fruits may be in demand throughout the year; however, owing to their seasonal nature, it may not be possible to cultivate these crops. Further, some plants may have requirement of a particular amount of sunlight, i.e., exposure to sunlight for a particular time-period. For example, in summers when the sunlight may be available for a longer time-period in a day as compared to winters, the excess sunlight may adversely affect the sustenance and growth of certain plants.

One possible solution is to cultivate these plants within a greenhouse. As it will be appreciated by those skilled in the art, the greenhouse is a structure for providing controlled environment for plants. The greenhouse may include walls and roof made of a transparent or translucent material (for example, glass or plastic sheets) defining an interior space. The transparent or translucent nature of the walls permits sunlight to pass into the interior space. Further, the greenhouse is capable of trapping heat, moisture, and gases like carbon dioxide. As such, a greenhouse creates a microclimate zone by isolating the plants from external climate factors of moisture, temperature, snow, and wind. Therefore, it becomes possible to cultivate plants in colder climates, even when the plants are not suited for such cold climates.

The greenhouse may be entailed to control the amount of sunlight to which the plants may be exposed to. To this end, some greenhouses may be equipped with movable and removable shades. However, owing to the large size of the greenhouses, operating and managing these shades is a challenge. For example, the long length of the shades (extending along the length of the greenhouse) makes it difficult to operate and manage the shades. Further, it is desirable to control the extent of shading (i.e. complete shading or partial shading) provided by the shades to precisely control the exposure of plants to sunlight.

As such, the available shading solutions are limited in their utility due to the inability to control the extent of shading, lack of versatility, ease of operation, durability, simplicity, and ease of deployment.

SUMMARY

A greenhouse shading system is disclosed. The greenhouse shading system may be deployed on a greenhouse and may include a plurality of shades. Thus, the greenhouse shading system enables shading and un-shading of an interior space defined by the greenhouse using the plurality of shades, thereby providing the benefit of controlling ambient environment within the greenhouse by selectively blocking the natural light from entering the interior space.

In one illustrative configuration, the present disclosure may include a greenhouse shading system that may include a plurality of main trusses. Each main truss may include an overhead portion defining a first end and a second end oppositely disposed from the first end, a first post formed on the first end of the overhead portion, and a second post formed on the second end of the overhead portion. The second post may be symmetrically formed to the first post. Each main truss of the plurality of main trusses may be rigidly erected on the ground via the first post and the second post. The plurality of main trusses may be aligned along a path. In one illustrative configuration, the greenhouse may further include a translucent cover positioned along a periphery of, and attached to, the plurality of main trusses to form an enclosure. The translucent cover may define an interior space.

In another illustrative configuration, the present disclosure may further include a plurality of tracks attached to the plurality of main trusses along the path defined by the plurality of main trusses. The plurality of tracks may be aligned with the path defined by the plurality of main trusses. In one illustrative configuration, the greenhouse may further include a plurality of gantries positioned within the interior space. Each gantry may include an inverted U-shape frame. The inverted U-shape frame may include a web defining a first end and a second end oppositely disposed from the first end, a first leg formed on the first end of the web, and a second leg formed on the second end of the web and symmetrical to the first leg. The web, the first leg, and the second leg may define a gantry plane perpendicular to the path defined by the plurality of main trusses.

In another illustrative configuration, the present disclosure may further include a plurality of drive rods connecting the plurality of gantries together with the gantry plane of each gantry parallel to the other gantry planes of the plurality of gantries. In one illustrative configuration, the greenhouse may further include a plurality of trolleys fixedly attached to the plurality of drive rods and slidingly engaged with the plurality of tracks. The plurality of gantries may be configured to move along the plurality of tracks via the plurality of trolleys. In one illustrative configuration, the greenhouse may further include a plurality of shades. Each shade may include a first edge attached to a gantry of the plurality of gantries, and a second edge oppositely disposed from the first edge. The second edge may be attached to a main truss of the plurality of main trusses.

In another illustrative configuration, the present disclosure may further include a drive system. The drive system may include a drive source coupled to one of the plurality of gantries, or at least one drive rod, or the plurality of trolleys. The drive source may be configured to move each gantry of the plurality of gantries between a closed position and an open position. In response to the movement of each of the gantries between the open position and the closed position, the first edge of at least one shade may be configured to move relative to the second edge.

In another illustrative configuration, the present disclosure may include a shade system for a greenhouse structure. The shade system may include a plurality of tracks configured to attach to the greenhouse structure. The greenhouse structure defines an interior space. In one illustrative configuration, the shade system may further include a plurality of gantries configured to be positioned within the interior space. Each gantry may include an inverted U-shape frame. The inverted U-shape frame may include a web defining a first end and a second end oppositely disposed from the first end, a first leg formed on the first end of the web, and a second leg formed on the second end of the web and symmetrical to the first leg. The web, the first leg, and the second leg may define a gantry plane.

In another illustrative configuration, the present disclosure of the shade system may further include a plurality of drive rods connecting the plurality of gantries together. the shade system may further include a plurality of trolleys fixedly attached to the plurality of drive rods and slidingly engaged with the plurality of tracks. The plurality of gantries may be configured to move along the plurality of tracks via the plurality of trolleys. In one illustrative configuration, the shade system may further include a plurality of shades. Each shade may include a first edge configured to attach to a gantry of the plurality of gantries, and a second edge oppositely disposed from the first edge. The second edge may be attached to the structure of the greenhouse.

In another illustrative configuration, the present disclosure of the shade system may further include a drive system. The drive system may include a drive source coupled to one of the plurality of gantries, or at least one drive rod, or the plurality of trolleys. The drive source may be configured to move each gantry of the plurality of gantries between a closed position and an open position. In response to the movement of each of the gantries between the open position and the closed position, the first edge of at least one shade may be configured to move relative to the second edge.

In another illustrative configuration, the present disclosure may include a method of shading a greenhouse structure. The method may include attaching a plurality of tracks to the greenhouse structure. The greenhouse structure defines an interior space. The method may further include positioning a plurality of gantries within the interior space. Each of the plurality of gantries may include an inverted U-shape frame. The inverted U-shape frame may include a web defining a first end and a second end oppositely disposed from the first end, a first leg formed on the first end of the web, and a second leg formed on the second end of the web and symmetrical to the first leg. The web, the first leg, and the second leg define a gantry plane.

In another illustrative configuration, the present disclosure may further include connecting the plurality of gantries together by a plurality of drive rods, and slidingly engaging, with the plurality of tracks, a plurality of trolleys fixedly attached to the plurality of drive rods. The plurality of gantries may be configured to move along the plurality of tracks via the plurality of trolleys.

In another illustrative configuration, the present disclosure may further include providing a plurality of shades. Each shade may include a first edge, and a second edge oppositely disposed from the first edge. Providing the plurality of shades may include attaching the first edge to a gantry of the plurality of gantries, and attaching the second edge to the greenhouse structure.

In another illustrative configuration, the present disclosure may further include providing a drive system. The drive system may include a drive source coupled to one of the plurality of gantries, or at least one drive rod, or the plurality of trolleys. In one illustrative configuration, the method may further include triggering the drive system to move each gantry of the plurality of gantries between a closed position and an open position. In response to the movement of each of the gantries between the open position and the closed position, the first edge of at least one shade moves relative to the second edge.

In another illustrative configuration, the present disclosure may further include providing a greenhouse system including a plurality of main trusses aligned along a path. The greenhouse system includes a translucent cover positioned along a periphery of, and attached to, the plurality of main trusses to form an enclosure. The greenhouse system may further include a plurality of tracks attached to the plurality of main trusses along the path defined by the plurality of main trusses; wherein the plurality of tracks are aligned with the path defined by the plurality of main trusses. The greenhouse system may further include a plurality of gantries positioned within the interior space, wherein each gantry includes an inverted U-shape frame, and a plurality of drive rods connecting the plurality of gantries together with the gantry plane of each gantry parallel to the other gantry planes of the plurality of gantries. The greenhouse system may further include a plurality of trolleys fixedly attached to either the plurality of gantries or the plurality of main trusses and slidingly engaged with the plurality of tracks or the plurality of drive rods, wherein the plurality of gantries are configured to move relative to the plurality of main trusses via the plurality of trolleys. The greenhouse system includes a plurality of shades, each including a first edge attached to a gantry of the plurality of gantries and a second edge oppositely disposed from the first edge, the second edge attached to a main truss of the plurality of main trusses; a drive system including a drive source coupled to one of the plurality of gantries, or at least one drive rod, or the plurality of trolleys; and wherein the drive source is configured to move each gantry of the plurality of gantries between a closed position and an open position; and wherein, in response to movement of each of the gantries between the open position and the closed position, the first edge of at least one shade is configured to move relative to the second edge.

Further areas of applicability of the present disclosure will become apparent from the detailed description provided hereinafter. It should be understood that the detailed description and specific examples, while indicating various configuration, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as illustrative only, with the true scope and spirit being indicated by the following claims.

It is desirable to provide a greenhouse shade/shading system that includes shades positioned or placed in multiple zones formed within a greenhouse. Each of the shades may be selectively opened or closed to at least partially block the natural light from entering the greenhouse based on a cultivator's requirements. The opening and closing of the shades are controlled by a drive system that is cooperatively coupled to multiple drive rods and enables movement of multiple gantries in each zone within the greenhouse. Since the shades are attached to the multiple gantries that are moveable and to main trusses in the greenhouse that are fixed, movement of the gantries results in opening or closing of the shades based on the direction of movement of the gantries. The drive system may be easily operated and activated either on-site or remotely with a touch of a button. The process of completely opening or completely closing the shades may be completed in a very short span of time (for example, less than a minute) post activation. In other words, the greenhouse may instantly transition from a completely unshaded state to a completely shaded and vice versa at a touch of a button. Thus, the greenhouse shading system (shade system) of the present disclosure is efficiently and precisely able to control the extent of shading in the greenhouse, while at the same time being versatile, durable, and easy to deploy and operate.

Figure 1:
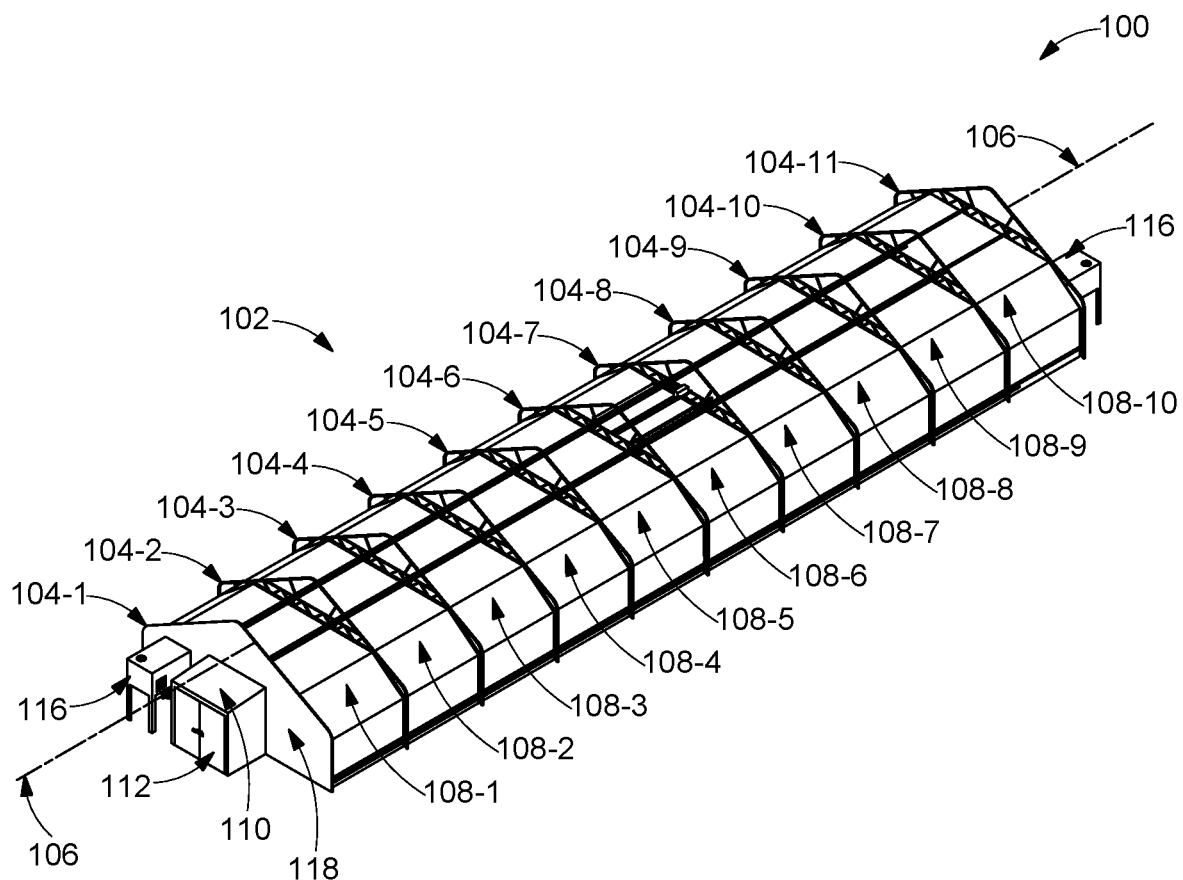
FIG. 1 illustrates a top perspective view of an illustrative greenhouse, in accordance with an illustrative configuration of the present disclosure.

Referring now to FIG. 1, a top perspective view 100 of an illustrative version of a greenhouse 102 is shown, in accordance with a configuration of the present disclosure. The greenhouse 102 may include a plurality of main trusses 104. In the current configuration, the greenhouse 102 is depicted to include eleven main trusses, i.e., main trusses 104-1 to 104-11 (which are collectively referred to as the plurality of main trusses 104). The plurality of main trusses 104 may be constructed using square or rectangular hollow section steel tubes, each of which may have specifications of 1.5 inches with a 14 gauge thickness. It will be understood that the number of main trusses 104 may be increased or decreased depending on the desired size and capacity of the greenhouse 102.

The plurality of main trusses 104 may be aligned along a path 106. In the current configuration, the path 106 may be a straight line. However, in various configurations the path 106 may be curved, e.g. a circle or a semicircle. The plurality of main trusses 104 are further explained in conjunction with FIGS. 2 and 3. In some illustrative configurations, the greenhouse 102 may be 30 feet wide and 120 feet long. The area between two adjacent main trusses 104 may form a zone and in case of this illustrative configuration, the plurality of main trusses 104 may be arranged such that 10 such zones may be formed. The length of each zone may be approximately 12 feet and the width may be approximately 30 feet. In some other illustrative configurations, the greenhouse 102 may be 40 feet wide and 132 feet long.

The greenhouse 102 may further include a plurality of shades 108, such that, each of the plurality of shades 108 is positioned or placed between two consecutive main trusses 104. In some configurations, the plurality of shades 108 may be termed as screens. In other words, each zone of the greenhouse 102 may include one of the plurality of shades 108. In the current configuration, the greenhouse 102 is depicted to include ten shades 108-1 to 108-10 (which are collectively referred to as the plurality of shades 108). By way of an example, the shade 108-1 is positioned between the main trusses 104-1 and 104-2 and the shade 108-9 is positioned between the main trusses 104-9 and 104-10. The perspective view depicts the greenhouse 102 in a closed state or a completely shaded state, such that, each of the plurality of shades 108 are completely open thereby blocking natural light from entering an interior space (not show) formed within the greenhouse 102.

The plurality of shades 108 may be made using material that is capable of blocking natural light when completely opened in the closed position of the greenhouse 102. In some configurations, the plurality of shades 108 may be an obscure screening and may include three layers that are sewed together. The three layers may include two layers of metalized fabric on the outside and a black fabric layer sandwiched between the two outer layers. The metalized fabric may have aluminum-coated over a fabric. The use of metalized fabric ensures that its reflective property blocks a hundred percent of the natural light coming in, while the black fabric helps in heat absorption. Alternatively, any type of material that uses a flexible material to cast a shadow may be employed, for example tarpaulin made of cloth or plastic such as polyethylene, canvas, vinyl, burlap, etc.

The interior space is defined by a translucent cover (not shown) positioned along a periphery of and attached to the plurality of main trusses 104 to form an enclosure. As will be appreciated, the greenhouse 102 may provide a controlled environment of temperature, light, moisture, atmospheric air composition, etc. The translucent cover provides for controlling the environment inside the interior space by shielding it from external environment and various elements of nature. The translucent cover may further control moisture and the air composition inside the interior space. In some configurations, the translucent cover may include a plurality of panels positioned along the periphery of the plurality of main trusses 104. These pluralities of panels may be transparent or translucent having a degree of opacity or tint.

It will be understood that the greenhouse 102 may be kept in a partially open state/partially shaded state (where the plurality of shades 108 are partially open) or a completely open state/completely unshaded state (where the plurality of shades 108 are completely closed or curled) based on the amount of natural light desired within the interior space. The mechanism that facilitates transition of the plurality of shades 108 between one or more of the completely open state, a partially open state, or the completely closed state is explained in detail in conjunction with FIGS. 7, 8, 14, 15, and 16.

In some configurations, both ends of the greenhouse 102 are covered using metal panels, i.e., a first wall configured as a first end panel 118 attached to the main truss 104-1 and parallel second wall configured as a second end panel (not shown) attached to the main truss 104-11 and oppositely disposed from the first end panel 118. Each of the first end panels 118 and the second end panel may be made up of corrugated metal sheets. The corrugated metal sheets act as an effective barrier towards external environment and provides rigidity to the overall structure of the greenhouse 102. On the inside of the greenhouse 102, a foam of at least one inch thickness is attached to each of the first end panel 118 and the second end panel. The foam is further coated with spray foam to increase insulation from the external environment.

The greenhouse 102 may further include an entry enclosure 110 that is formed on the first end panel 118. The entry enclosure includes external doors 112 and internal doors 114 (not shown in FIG. 1) that are parallel to and offset from the external doors 112. The external doors 112 and the internal doors 114 may be used by personnel to enter or exit the greenhouse 102. These doors 112 and 114 may also be used to bring in machinery, tractors, and/or other equipment inside the greenhouse 102. The entry enclosure 110 forms a space that is separated from the interior space within the greenhouse 102. Further, the provision of the external doors 112 and the internal doors 114 ensures that the ambient environment within the greenhouse 102 is not directly exposed to the outside environment, whenever someone wants to enter or exit the greenhouse 102. As a result, the ambient environment within the greenhouse 102 is consistently maintained even when it is being accessed by personnel.

To further maintain the temperature and humidity levels within the greenhouse 102, heating and cooling systems 116 are provided at both ends of the greenhouse 102. The heating and cooling systems 116 may be Heating Ventilation and Air Conditioning (HVAC) systems. One of the heating and cooling systems 116 is affixed to the first end panel 118, while the other one of the heating and cooling systems 116 is affixed to the second end panel.

Figure 2:
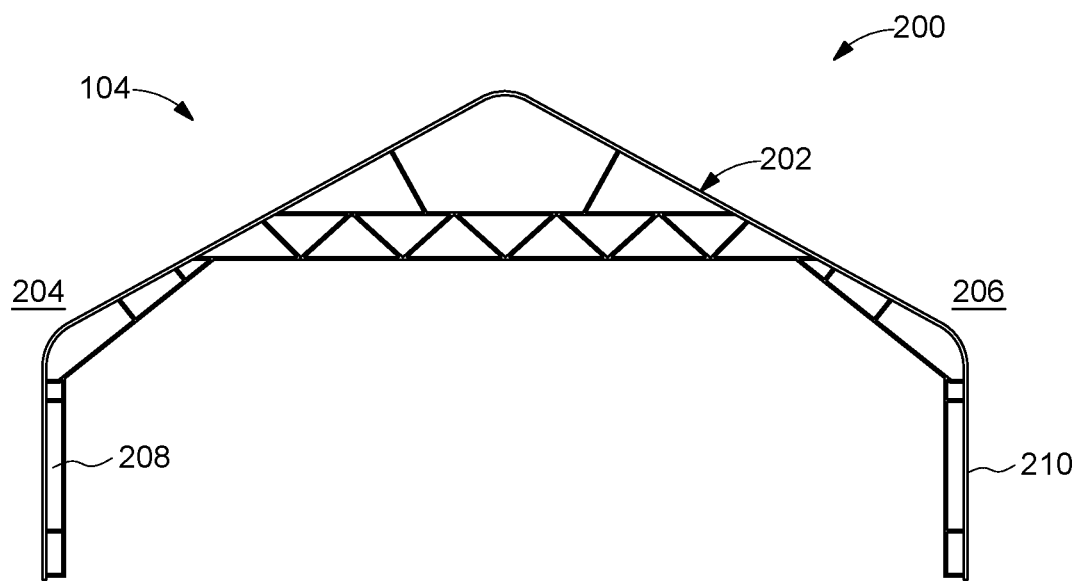
FIG. 2 illustrates a front view of a main truss, in accordance with an illustrative configuration of the present disclosure.
Figure 3:
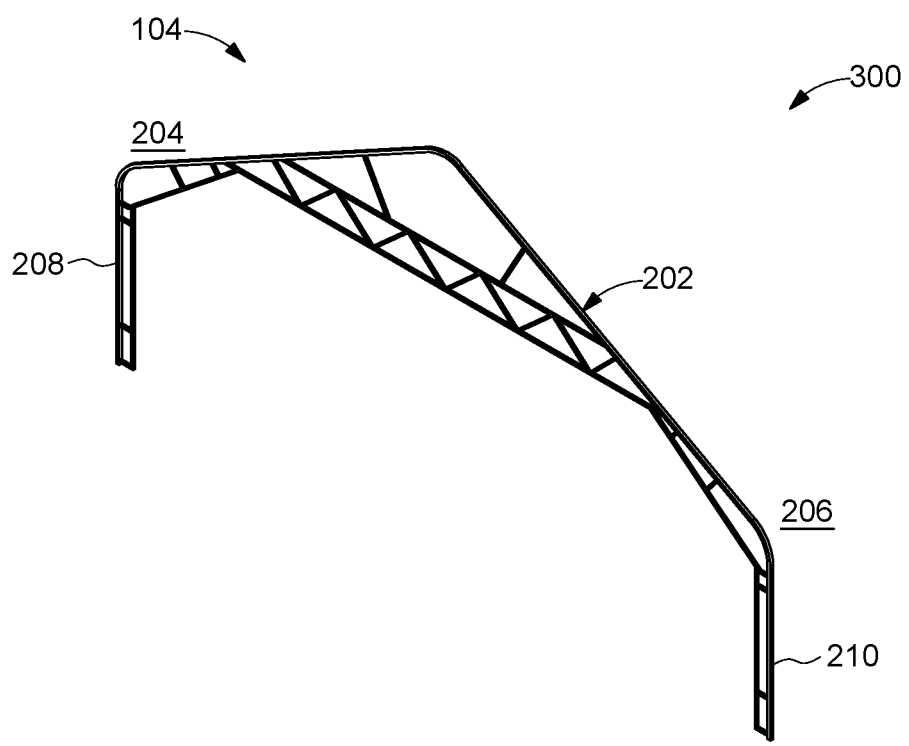
FIG. 3 illustrates a top perspective view of a main truss, in accordance with an illustrative configuration of the present disclosure.

With reference to FIGS. 2-3, a front view 200 and a top perspective view 300 of the main truss 104 are respectively illustrated, in accordance with a configuration of the present disclosure. The main truss 104 may include an overhead portion 202 defining a first end 204 and a second end 206 oppositely disposed from the first end 204. The main truss 104 may further include a first post 208 formed on the first end 204 of the overhead portion 202. Further, the main truss 104 may include a second post 210 formed on the second end 206 of the overhead portion 202. The second post 210 may be symmetrically formed to the first post 208. It may be noted that the main truss 104 may be made of a metal, an alloy, and the like. Further, the main truss 104 may include structure elements to impart strength, based on the size and load-carrying capacity required of the main truss 104. The main truss 104 may be rigidly erected on the ground via the first post 208 and the second post 210. It may be noted that the plurality of main trusses 104 may be aligned along the path 106 as depicted in FIG. 1.

Figure 4:
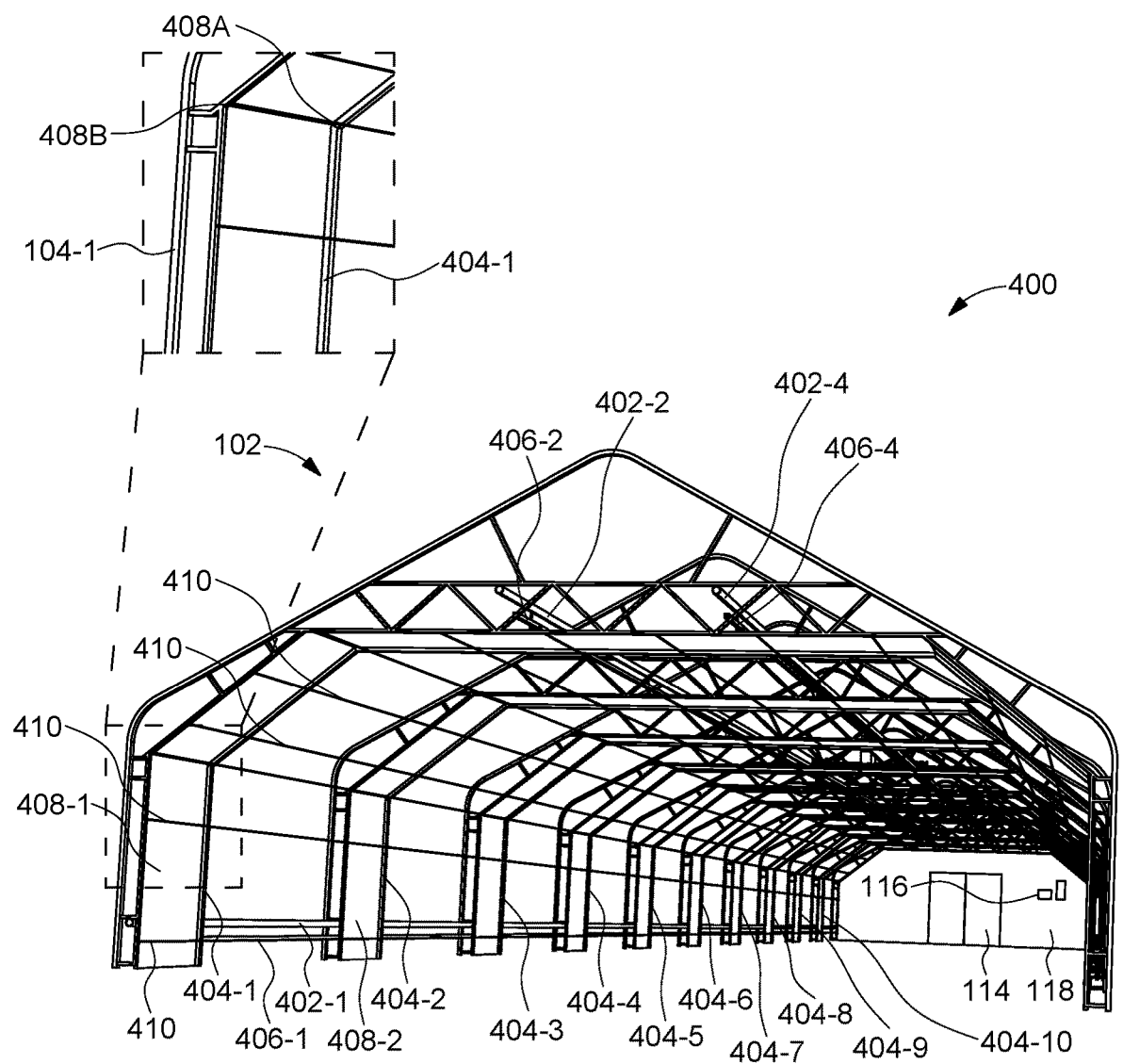
FIG. 4 illustrates a front perspective view of a greenhouse in a partially shaded state, in accordance with an illustrative configuration of the present disclosure.

Referring now to FIG. 4, a front perspective view 400 of the greenhouse 102 in a partially shaded state is illustrated, in accordance with a configuration of the present disclosure. As shown in FIG. 4, the greenhouse 102 may include a plurality of tracks 402 that may be attached to the plurality of main trusses 104. The plurality of tracks 402 may be aligned along the path 106 defined by the plurality of main trusses 104. In other words, in the configurations with the path 106 being a straight line, the plurality of tracks 402 may also be aligned along the straight line. In alternate configurations with the path 106 being a curve (e.g. a semicircle), the plurality of tracks 402 may be aligned along the curve.

It may be noted that each of the plurality of tracks 402 may be made of a metal, an alloy or the like. The plurality of tracks 402 may attached to each of the plurality of main trusses 104 by way of welding. In other configurations, the plurality of tracks 402 may be attached to each of the plurality of main trusses 104 by way of various fastening means that may include, but are not limited to screws, nails, rivets, nuts and bolts, or anchors. Each of the plurality of tracks 402 may include a hollow profile (e.g. a hollow cylindrical profile, a square profile, or other shape such as an I-Beam) and may further include a groove (not shown in FIG. 4) running along its length. In some embodiments, as shown in the FIG. 4, the plurality of tracks 402 may include four tracks, i.e. a bottom left track 402-1, a top left track 402-2, a bottom right track 402-3 (not shown in FIG. 4), and a top right track 402-4. In alternate configurations, the plurality of tracks 402 may include any number of tracks based on the requirement. As will be apparent, the plurality of tracks 402 may run the length of the greenhouse 102. By way of an example, when length of the greenhouse 102 is 120 feet, each of the plurality of tracks 402 may also be 120 feet long or slightly less than 120 feet, such that, each of the plurality of tracks 402 at least completely covers the span of each zone formed within the greenhouse 102.

With continued reference to FIG. 4, the greenhouse 102 may further include a plurality of gantries 404. In the current configuration, the greenhouse 102 is depicted to include ten gantries 404-1, 404-2, ... 404-10 (collectively or individually referred to as the plurality of gantries 404). The plurality of gantries 404 may be positioned within the interior space of the greenhouse, such that, each zone formed by two adjacent main trusses 104 may include one gantry 404. The structure of the plurality of gantries 404 is further explained in conjunction with FIGS. 5-6.

Figure 5:
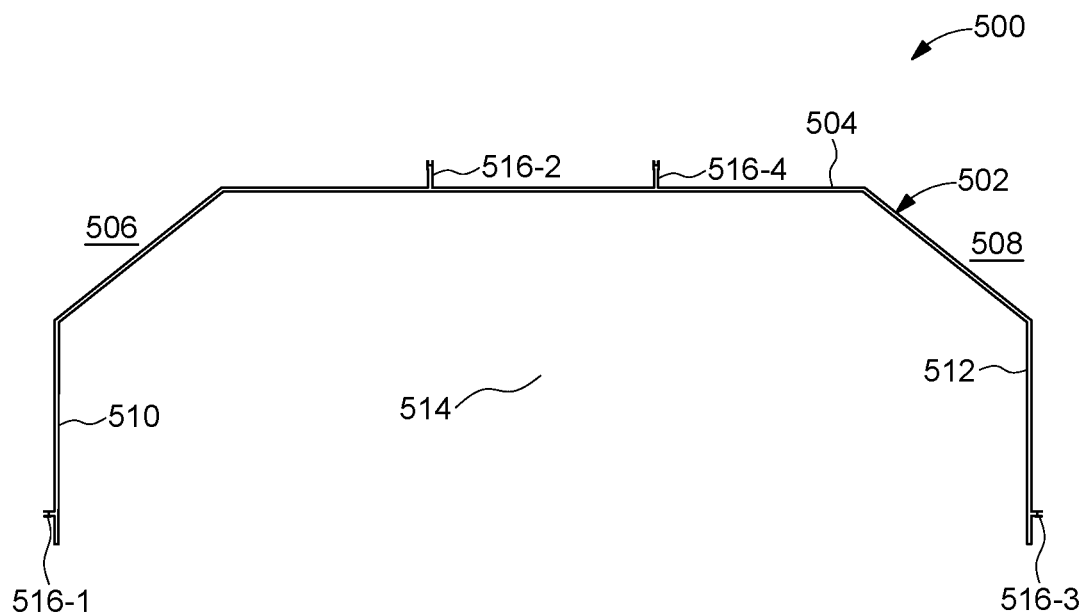
FIG. 5 illustrates a front view of a gantry, in accordance with an illustrative configuration of the present disclosure.
Figure 6:
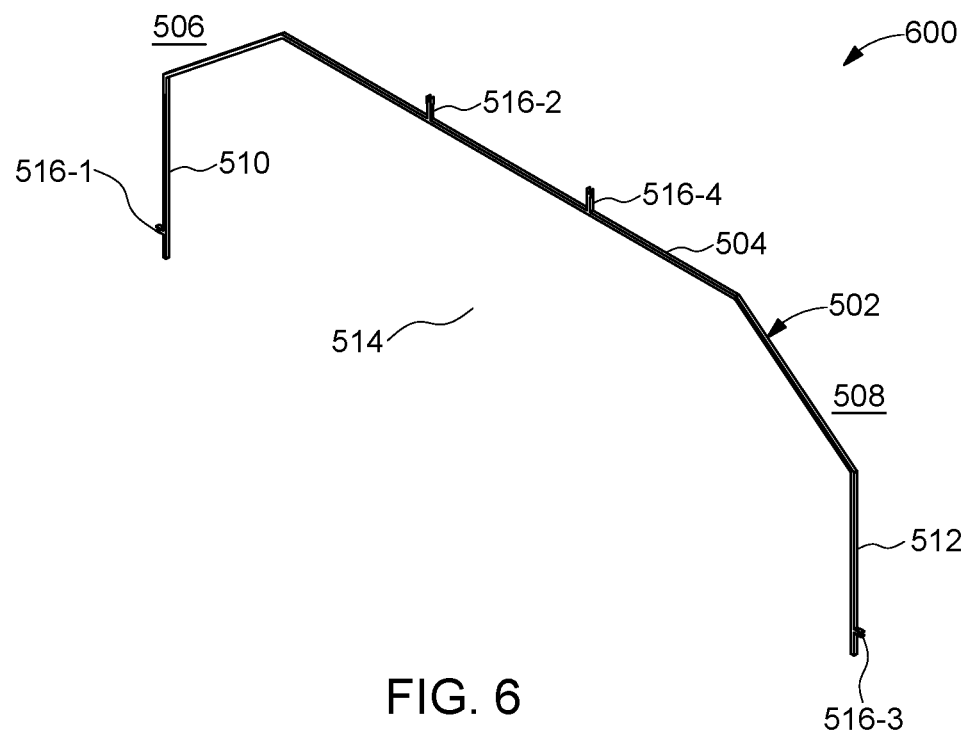
FIG. 6 illustrates a top perspective view of a gantry, in accordance with an illustrative configuration of the present disclosure.

Referring now to FIGS. 5-6, a front view 500 and a top perspective view 600, respectively, of the gantry 404 are respectively illustrated, in accordance with some configurations of the present disclosure. The gantry 404 may include an inverted U-shape frame 502 constructed using square or rectangular hollow section steel tubes, each of which may have specifications of 1.5 inches of 14 gauge thickness. The inverted U-shape frame 502 may include a substantially horizontal member 504 that may further defines a first end 506 and a second end 508 oppositely disposed from the first end 506. In other configurations, the horizontal member 504 may be replaced by a web. The inverted U-shape frame 502 may further include a first leg 510 formed on the first end 506 and a second leg 512 formed on the second end 508. The second leg 512 may be symmetrical to the first leg 510. It may be noted that the horizontal member 504, the first leg 510, and the second leg 512 may define a gantry plane 514. In other words, the horizontal member 504, the first leg 510, and the second leg 512 may be coplanar, i.e., lie in the same plane. The gantry plane 514 may be perpendicular to the path 106 defined by the plurality of main trusses 104.

With reference to FIG. 4, in some configurations, the gantry plane 514 of each gantry 404 may be parallel to the gantry planes of the remaining plurality of gantries 404. As will be understood, in the configurations with the path 106 being a straight line, the gantry planes 514 of the plurality of gantries 404 may be parallel to each other. However, in the configurations with the path 106 being curved, the gantry planes 514 of the plurality of gantries 404 may not be parallel to each other. Each of the plurality of gantries 404 is configured to engage with each of the plurality of tracks 402, i.e., the bottom left track 402-1, the top left track 402-2, the bottom right track 402-3, and the top right track 402-4. As a result of this engagement, each of the bottom left track 402-1, the top left track 402-2, the bottom right track 402-3, and the top right track 402-4 is configured to enable and guide movement of the plurality of gantries 404.

To this end, greenhouse 102 may include a plurality of drive rods 406. In some configurations, as shown in FIG. 4, the greenhouse 102 may include four drive rods 406-1, 406-2, 406-3, and 406-4 (collectively or individually referred to as plurality of drive rods 406 or a drive rod 406). However, in alternate configurations, the greenhouse 102 may include any number of drive rods 406, based on the requirement. The plurality of drive rods 406 may connect the plurality of gantries 404, separated by a distance. This is further explained in conjunction with FIGS. 5 and 6.

Referring now to FIGS. 5 and 6, each of the plurality of gantries 404 may further include a plurality of arms 516 that may be used to attach the plurality of gantries 404 with the plurality of drive rods 406. The arm 516 may be integrated and formed within the gantry 404 at the time of manufacturing or may be a bracket that is separately attached to the gantry 404. The dimensions of each of the plurality of arms 516 may be slightly more than the corresponding drive rod 406 to accurately receive and accommodate the drive rod 406. In the current configuration, the gantry 404 may include an arm 516-1, an arm 516-2, an arm 516-3, and an arm 516-4. By way of an example and referring back to FIG. 4, the arm 516-1 may get attached to the drive rod 406-1, the arm 516-2 may get attached to the drive rod 406-2, the arm 516-3 may get attached to the drive rod 406-3, and the arm 516-4 may get attached to the drive rod 406-4. The plurality of drive rods 406 may be attached to each of the plurality of arms 516 by way of welding. In other configurations, the plurality of drive rods 406 may be attached to each of the plurality of arms 516 by way of various fastening means that may include, but are not limited to screws, nails, rivets, nuts and bolts, or anchors.

Figure 7:
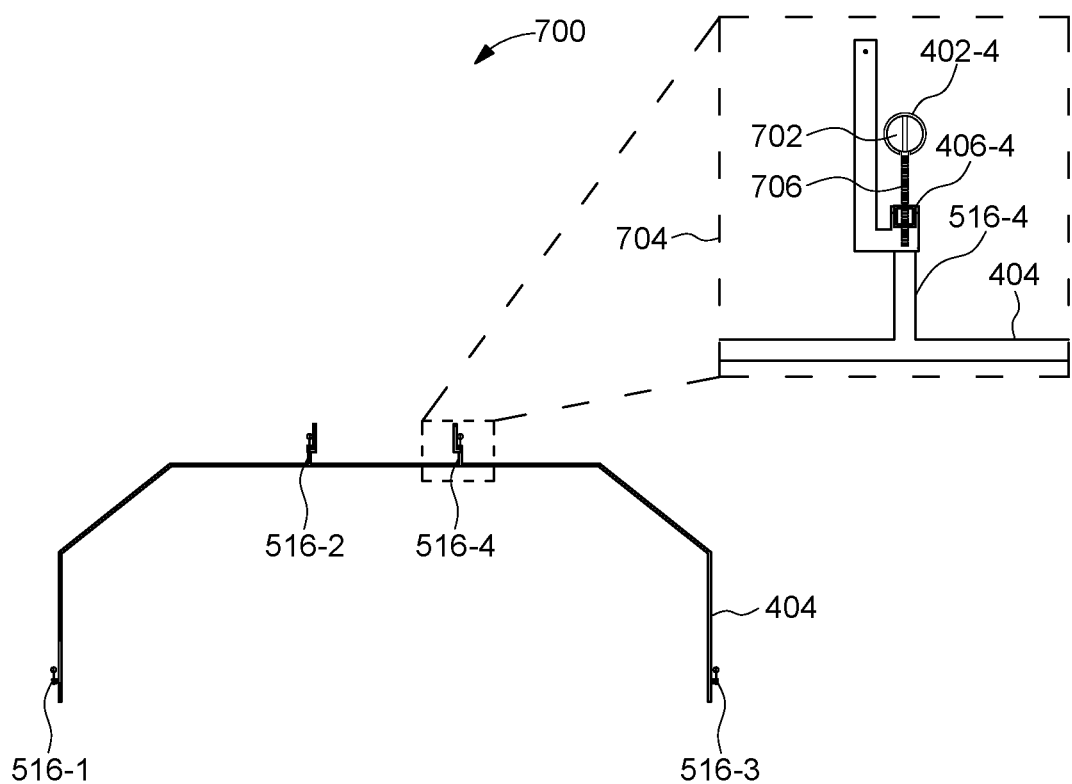
FIG. 7 illustrates a front view of a gantry attached to a drive rod and a track, in accordance with an illustrative configuration of the present disclosure.
Figure 8:
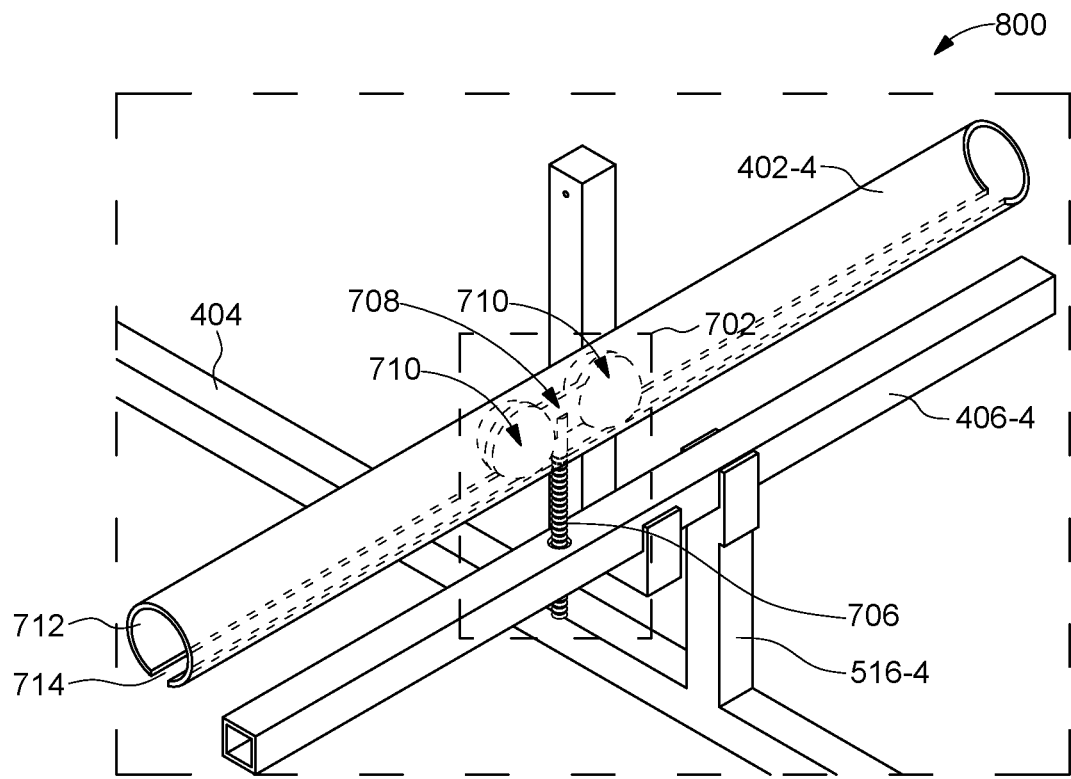
FIG. 8 illustrates a close-up perspective view of a gantry attached to a drive rod and a track, in accordance with an illustrative configuration of the present disclosure.

Referring now to FIGS. 7 and 8, a front view 700 and a close-up perspective view 800 of the gantry 404 attached to the drive rod 406 and the track 402 are respectively illustrated, in accordance with a configuration of the present disclosure. The greenhouse 102 may also include a plurality of trolleys 702, each of which may be fixedly attached to one of the plurality of drive rods 406. In some configurations, four drive rods 406 may be attached to one or more of the plurality of trolleys 702. By way of an example and referring back to FIG. 4, the drive rods 406-1, 406-2, 406-3, and 406-4 are fixedly attached to the plurality of trolleys 702. Alternatively, two of the plurality of drive rods 406 may be attached to one or more of the plurality of trolleys 702. By way of an example and referring back to the FIG. 4, the drive rods 406-2 and 406-4 may be fixedly attached to the plurality of trolleys 702, while the drive rods 406-1 and 406-3 may not be fixedly attached to any of the plurality of trolleys 702 and thus may perform the function of connecting the plurality of gantries 404.

The plurality of trolleys 702 may be configured to slidingly engage with the plurality of tracks 402. Further, the plurality of gantries 404 may be configured to move along the plurality of tracks 402 via the plurality of drive rods 406 and the plurality of trolleys 702. In some alternate configurations, the plurality of trolleys 702 may be directly attached to one or more of the plurality of gantries 404 instead of being attached to the plurality of drive rods 406. As such, the plurality of trolleys 702 may provide a low friction coupling of the plurality of gantries 404 with the plurality of plurality of tracks 402 to enable smooth movement of the plurality of gantries 404 along the plurality of tracks 402. By way of an example and referring back to FIG. 4, one or more of the plurality of trolleys 702 may be configured to engage with each of the bottom left track 402-1, the top left track 402-2, the bottom right track 402-3, and the top right track 402-4. In alternate configurations, by way of another example, one or more of the plurality of trolleys 702 may be configured to engage only with the top left track 402-2 and the top right track 402-4.

Since the plurality of drive rods 406 cause movement in the plurality of gantries 404 while engaging with the plurality of tracks 402, the plurality of drive rods 406 may not run the length of the greenhouse 102, unlike the plurality of tracks 402. Instead, the plurality of drive rods 406 span across the entire length of all but one zone in the greenhouse 102. With regards to the last zone, the plurality of drive rods 406 span across just a portion of the last zone. By way of an example, when length of the greenhouse 102 is 120 feet, each of the plurality of drive rods 406 may be 109-110 feet long. Such length of the plurality of drive rods 406 enables smooth opening and closing of the plurality of shades 408, when the greenhouse transitions between the closed position and the open position. Additionally, such length accommodates the length occupied by each of the plurality of shades 408, when they are curled-up. By way of an example, the curled-up shade 408 may occupy 1-2 feet of length in each zone.

Referring now to FIGS. 7 and 8, a single trolley 702 is depicted for ease of explanation. A close-up view 704 and the close-up perspective view 800 depict how the trolley 702 is attached to the drive rod 406-4. The trolley 702 includes a shaft 706 attached to a plate 708 at one end and fixedly attached to the drive rod 406-4 at the other end. The shaft 706 may be threaded and may thus be configured to be screwed into the drive rod 406-4. The drive rod 406-4 may accordingly be configured with a threaded slot to receive the shaft 706 of the trolley 702. The plate 708 connected to the shaft 706 may further be coupled to rolling members such as a pair of rollers 710. The pair of rollers 710 may be positioned inside a hollow cylindrical profile 712 of the track 402-4 and the shaft 706 may cooperate with a grove 714 that forms a C-section. This may enable sliding of the drive rod 406-4 and thus the gantry 404 attached to the drive rod 406-4 via the arm 516-4. The plurality of trolleys 702 are further explained in detail in conjunction with FIGS. 9, 10, and 11.

Figure 9:
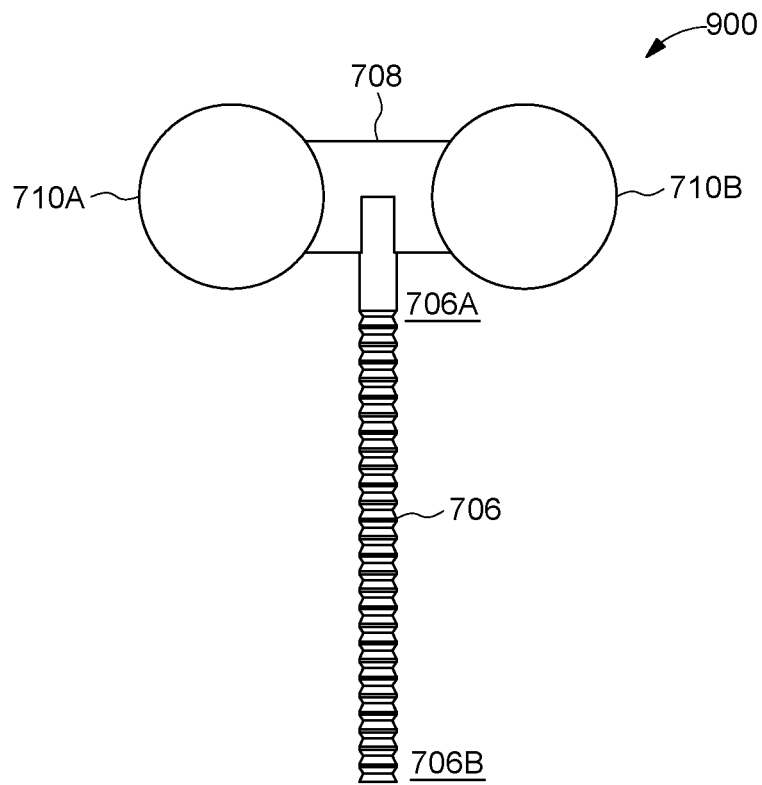
FIG. 9 illustrates a side view of a trolley, in accordance with an illustrative configuration of the present disclosure.
Figure 10:
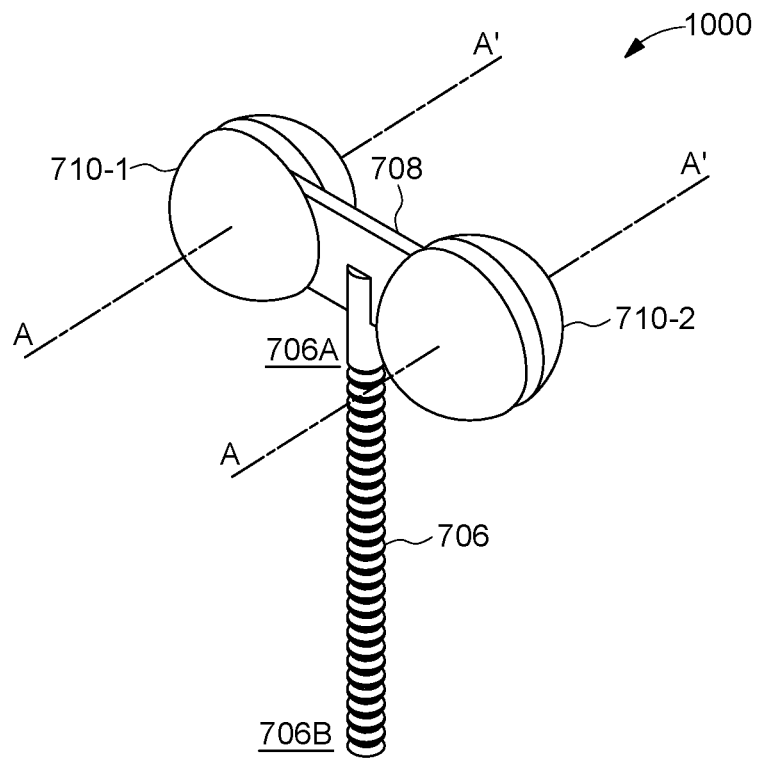
FIG. 10 illustrates a perspective view of a trolley, in accordance with an illustrative configuration of the present disclosure.
Figure 11:
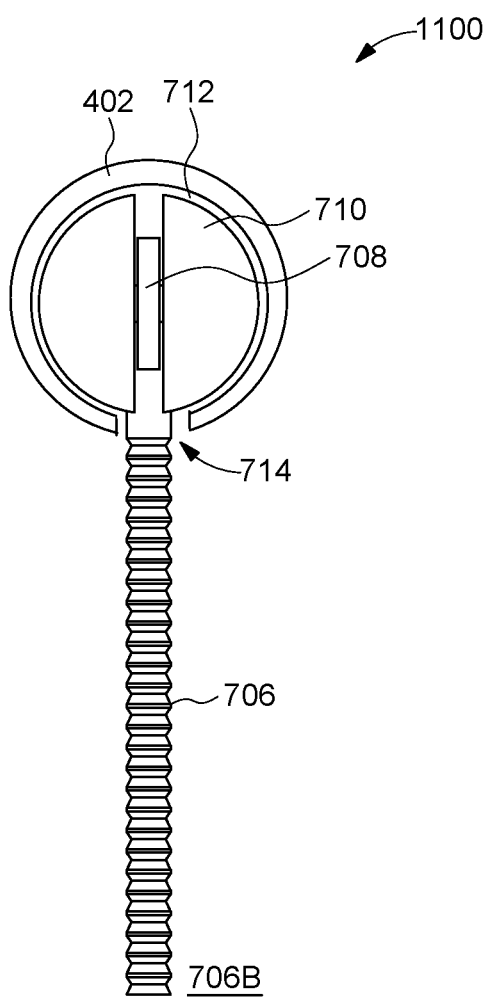
FIG. 11 illustrates a front view of a trolley, in accordance with an illustrative configuration of the present disclosure.

Referring now to FIGS. 9, 10, and 11 a side view 900, a perspective view 1000, and a front view 1100 of the trolley 702 are respectively illustrated, in accordance with a configuration of the present disclosure. As explained before, the trolley 702 may include the shaft 706 that may be threaded. The shaft 706 may include a first end 706B and a second end 706A. The trolley 702 may further include the plate 708 attached to the shaft 706 at the second end 706A of the shaft 706. In one configuration, the plate 708 may include a threaded orifice (not shown) that is configured to receive the second end 706A of the shaft 706 to attach the shaft 706 to the plate 708. The trolley 702 may further include the pair of rollers 710, i.e., a first roller 710A and a second roller 710B coupled to the plate 708. Each of the first roller 710A and the second roller 710B may be spherical in shape and may be configured to rotate relative to the plate 708, about a respective axis A-A'. It may be noted that the axis A-A' may be perpendicular to the plane of the plate 708.

It may be noted that the plurality of trolleys 702 may be fixedly attached to the plurality of drive rods 402 via the first end 706B of the shaft 706. It may further be noted that the plurality of trolleys 702 may be configured to slidingly engage with the plurality of tracks 402 via the first roller 710A and the second roller 710B. As illustrated in FIG. 9, each of the first roller 710A and the second roller 710B may be positioned inside the hollow cylindrical profile 712 of the track 402, with the shaft 706 of the trolley 702 extending out through the groove 714 of the track 402. In other words, the track 402 may include the hollow cylindrical profile 712 with the groove 714 forming a C-section. The first roller 710A and the second roller 710B of the trolley 702 may be captured inside the hollow cylindrical profile 712 of the track 402, with the shaft 706 of the trolley 702 extending out through the groove 714. This allows the trolley 702 to move along the length of the track 402 while remaining engaged with the track 402. Since the first end 706B is attached to the drive rod 406, which is further attached to the gantry 404, when the trolley 702 moves along the length of the track 402, the gantry 404 also moves along.

Referring back to FIGS. 1 and 4, the greenhouse 102 may further include a plurality of shades 408 (also referred to as the plurality of shades 108 in FIG. 1). By way of an example, the greenhouse 102 may include ten shades 408-1 to 408-10 (collectively or individually referred to as the plurality of shades 408 or shade 408). As will be understood that the number of shades 408 may vary depending on the size of the greenhouse 102, the number of main trusses 104, and the number of gantries 404 being used in the greenhouse 102. In some configurations, each of the plurality of shades 408 may be made from a translucent or opaque material, like a fabric sheet or a polymer sheet.

Each of the plurality of shades 408 may include a first edge 408A and a second edge 408B oppositely disposed from the first edge 408B. The first edge 408A may be attached to the gantry 404, while the second edge 408B may be attached to one of the plurality of main trusses 104. This is further illustrated and explained in FIG. 12A. The plurality of shades 408 may be kept in a desired position closer to the inner periphery of the translucent cover with the help of a plurality of guide wires 410, when the greenhouse 102 is in the completely shaded state or the partially shaded state. Moreover, in the completely unshaded state, the plurality of guide wires 410 ensure that the plurality of shades 408 are kept curled-up, so that they may smoothly uncurl when the greenhouse 102 is transitioning into the completely shaded state or the partially shaded state. The plurality of guide wires 410 may be attached to each of the plurality of main trusses 104 by way of a fender washer and lag bolt screwed into the main truss 104. The plurality of guide wires 410 may include braided wires that may be enclosed within a plastic coating to ensure frictionless movement of the plurality of shades 408. At the point of contact with the plurality of guide wires 410, the plurality of shades 408 may have a layer of abrasion-proof protective lining to avoid any damage to the plurality of shades 408 because of frequent curling and uncurling while being in contact with the plurality of guide wires 410. Various configuration of the plurality of guide wires 410 being attached to the plurality of main trusses 104 is depicted in FIGS. 13A and 13B.

In one configuration, the greenhouse 102 may include 18 guidewires placed at various location across the frame of each of the plurality of main trusses 104. By way an example and referring back to FIG. 2, for each of the plurality of main trusses 104, three guide wires 410 may be affixed to the first post 208, three guide wires 410 may be affixed to the second post 210, three guide wires 410 may be affixed over the first end 204, three guide wires 410 may be affixed over the second end 206, and six guide wires 410 may be affixed to the overhead portions 202. As will be appreciated, since the plurality of guide wires 410 are affixed to each of the plurality of main trusses 104, they run the entire length of the interior space within the greenhouse 102.

In a given zone of the greenhouse 102, each of the plurality of gantries 404 form a pair with one of the plurality of main trusses 104, such that, a given pair of gantry 404 and main truss 104 is attached to the same shade 408. By way of an example and referring back to FIG. 1 and FIG. 4, the shade 408-1 is attached to the main truss 104-1 and the gantry 404-1 and the shade 408-2 is attached to the main truss 104-2 and the gantry 404-2.

Further, referring back to FIGS. 4, 5, and 6, each of the plurality of shades 408 may extend along the periphery of the frame 502 of the gantry 404, encompassing the first leg 510, the first end 506, the second end 508, the horizontal member 504, and the second leg 512, as can be seen in the FIG. 4. In a similar manner, each of the plurality of shades 408 may extend along the periphery of the main truss 104 encompassing the overhead portion 202, the first post 208 formed on the first end 204 of the overhead portion 202, and the second post 210 formed on the second end 206 of the overhead portion 202. Thus, for a given pair of gantry 404 and main truss 104, when the gantry 404 moves in a direction away from the main truss 104, the shade 408 gets opened and the greenhouse 102 transitions into the partially shaded state or the completely shaded state. In a similar manner, for the given pair, when the gantry 404 moves in a direction towards the main truss 104, the shade 408 starts getting curled-up and the greenhouse 102 transitions into the partially shaded state or the completely unshaded state. The movement of the plurality of gantries 404 may be controlled by selectively moving one or more of the plurality of drive rods 406 (or the plurality of gantries 404 directly) via a drive system 1402. The drive system 1402 is further explained in detail in conjunction with FIGS. 14, 15, and 16.

Figure 12A:
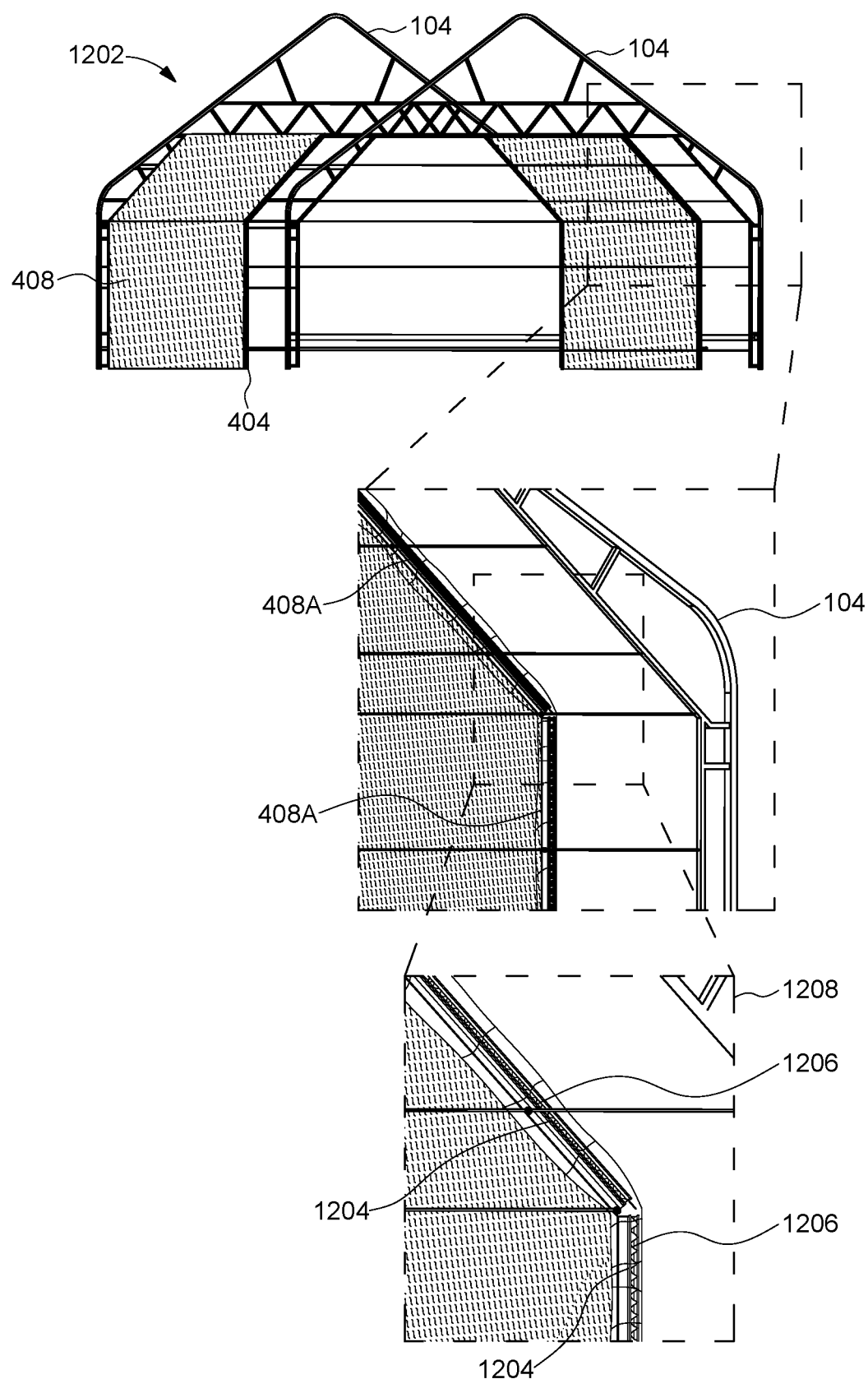
FIGS. 12A and 12B illustrate a shaded zone that includes a shade attached to a gantry and a main truss, in accordance with an illustrative configuration of the present disclosure.
Figure 12B:
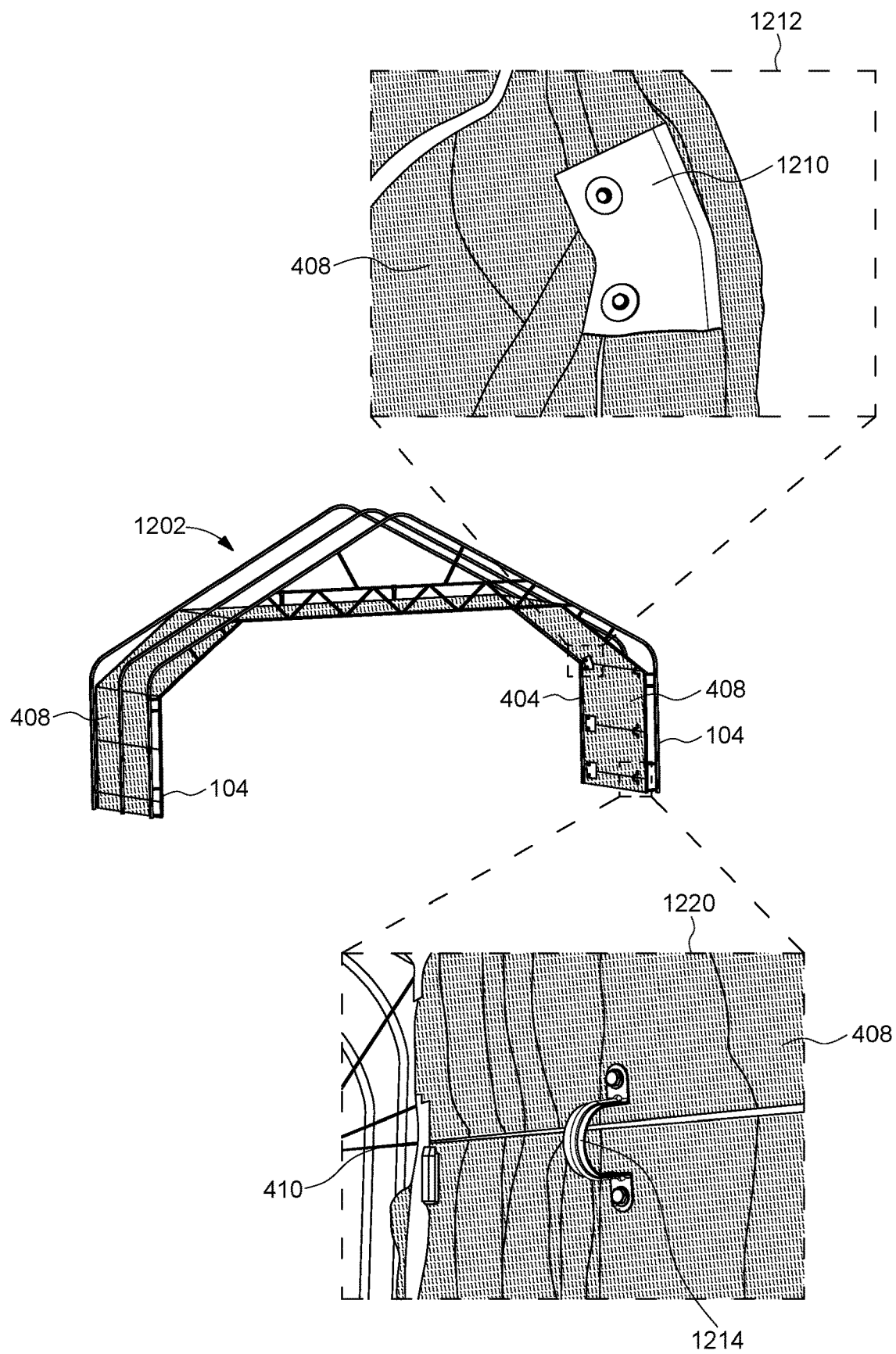
Figure 13A:
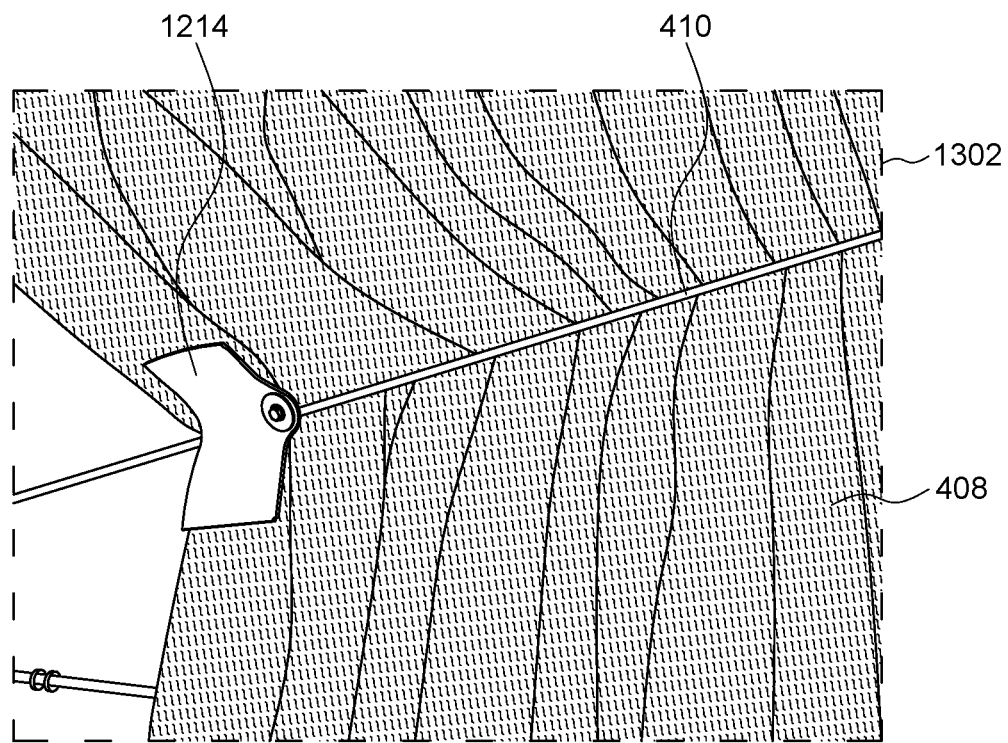
FIGS. 13A and 13B illustrate various configurations of a guide wire being attached to a main truss, in accordance with the present disclosure.
Figure 13A:
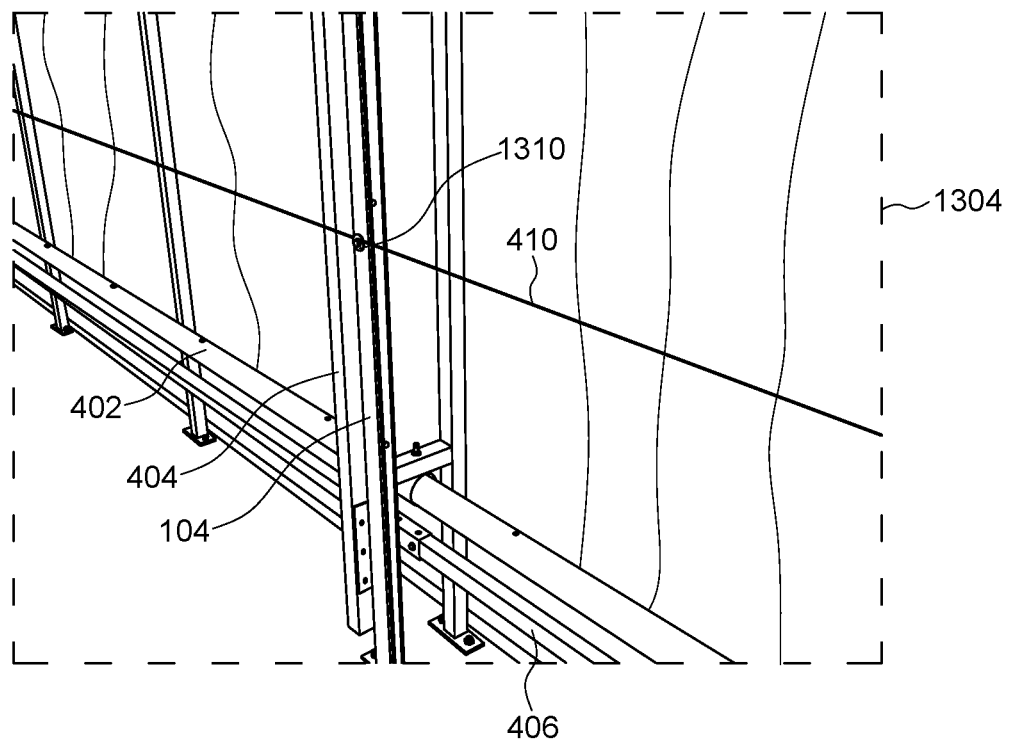
Figure 13B:
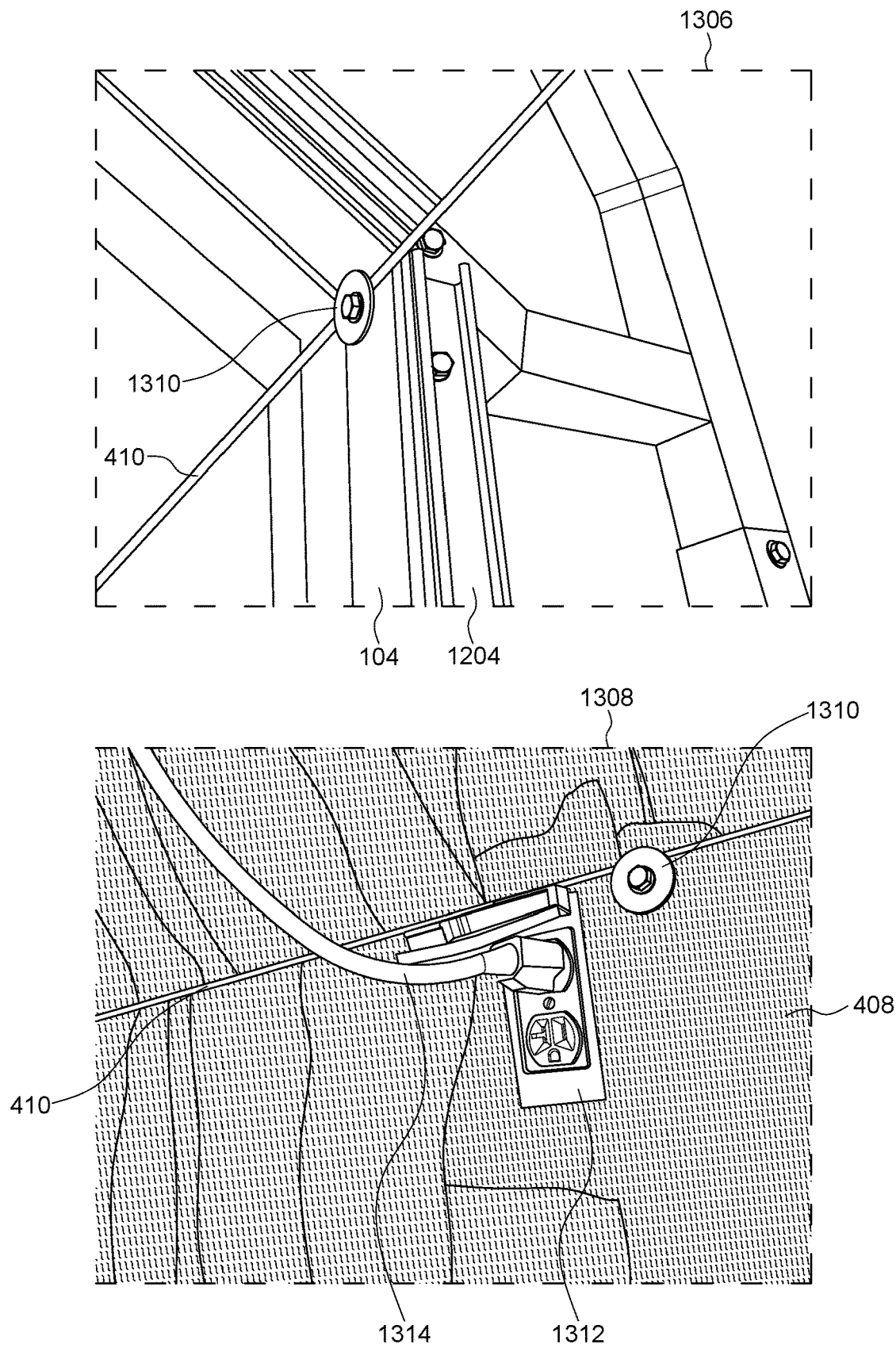

Referring now to FIGS. 12A and 12B, a shaded zone 1202 that includes the shade 408 attached to the gantry 404 and the main truss 104 is illustrated, in accordance with a configuration of the present disclosure. The shade 408 is affixed to the gantry 404 at the first edge 408A and the main truss 104 at the second edge 408B. The first edge 408A of the shade 408 may be attached to the gantry 404 by way of a wiggle wire channel 1204 and a wiggle wire 1206. The wiggle wire channel 1204 may be affixed along an edge of the frame 502 of the gantry 404, running along its length. The interlocking of the wiggle wire 1206 within the wiggle wire channel 1204 to attach the first edge 408A is depicted in a close-up view 1208. In a similar manner, the second edge 408B of the shade 408 may be attached to the main truss 104 by way of the wiggle wire channel 1204 and the wiggle wire 1206 (not shown). The wiggle wire channel 1204 may be affixed along an edge of the frame running along its length.

In one configuration, as depicted in FIG. 12B, to ensure that the shade 408 is able to completely block natural light in the completely shaded state of the greenhouse 102, the shade 408 may be extended beyond the point of attachment with the gantry 404. In order to keep the extended part of the shade 408 in place, a gripping member 1210 that extends up to a portion of the extended part may be placed over the shade 408 and may then be attached to the gantry 404 via washers and bolts. This is depicted in a close-up view 1212. In another configuration, in the completely unshaded state of the greenhouse 102 when the shade 408 is curled-up, in order to make sure that the shade 408 does not snip outside the guide wire 410, a u-shaped clamp 1214 is attached to the main truss 104 trapping a portion of the shade 408. This is depicted in a close-up view 1220. In absence of the u-shaped clamp 1214, the shade 408 may pull out and drag beyond the main truss 104. Such absence may lead to the shade 408 getting snagged on a screw head or any such protruding element, thereby tearing or damaging the shade 408.

Referring now to FIGS. 13A and 13B, various configurations of the guide wire 410 being attached to the main truss 104 are illustrated. A view 1302 depicts the guide wire 410 passing over and holding back the shade 408. Further, a different configuration of the gripping member 1214 attached over the shade 408 to the gantry 404 is also depicted. Views 1304 and 1306 depict the guide wire 410 in absence of the shade 408 tucked behind it. The guide wire 410 is affixed to the main truss 104 via a fender washer 1310 that is attached to the main truss 104 using a lag bolt. The view 1306 also depicts the wriggle wire channel 1204 attached to the main truss 104. A view 1308 additionally displays a pair of power sockets 1312 formed over the shade 408 and attached to the main truss 104. The pair of power sockets 1312 may further be connected to an electric supply (not shown). A power plug 1314 is plugged into one of the pair of power sockets 1312 and supplies power to various equipment and machinery within the greenhouse 102.

Figure 14:
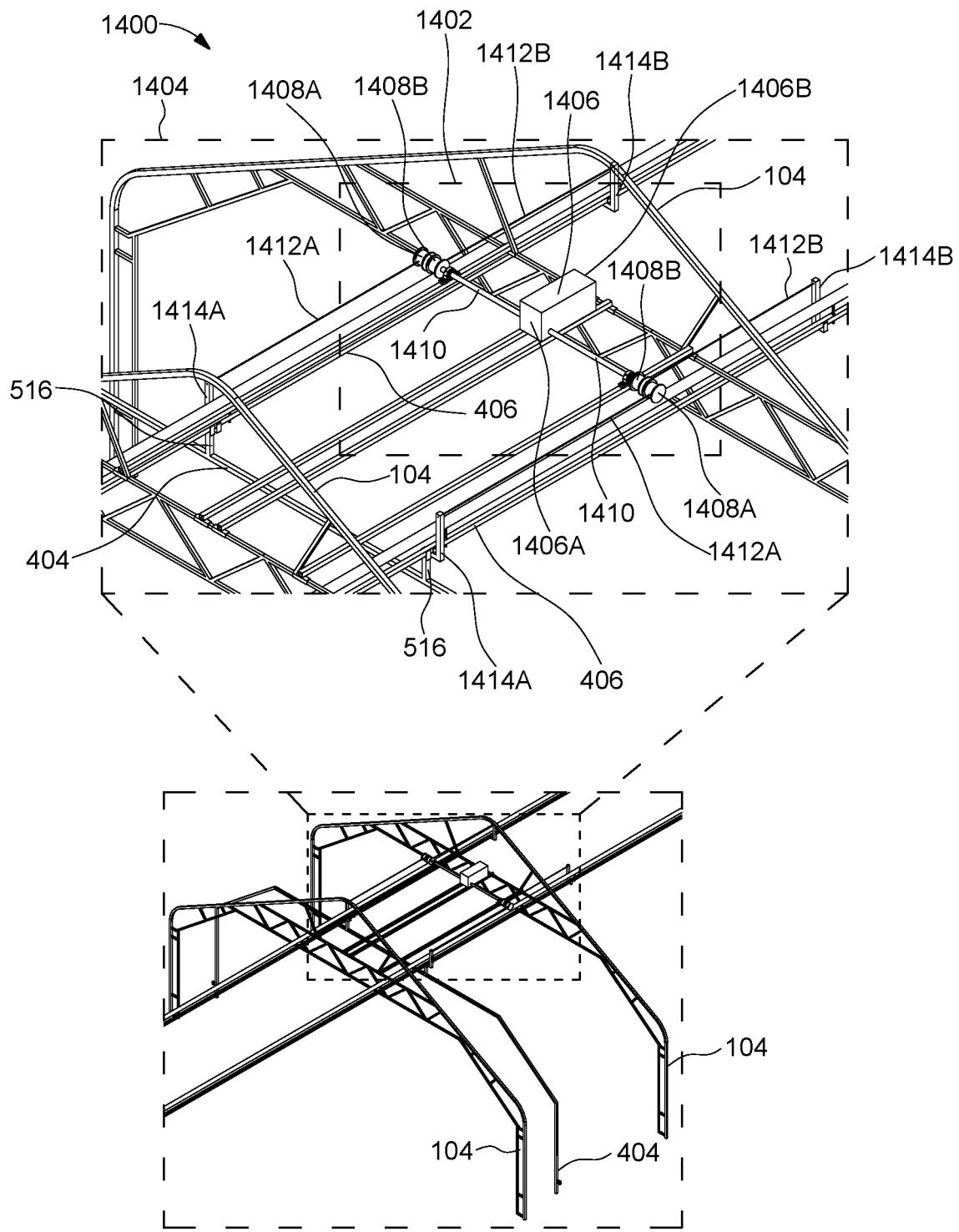
FIG. 14 illustrates a perspective view of a drive system, in accordance with an illustrative configuration of the present disclosure.
Figure 15:
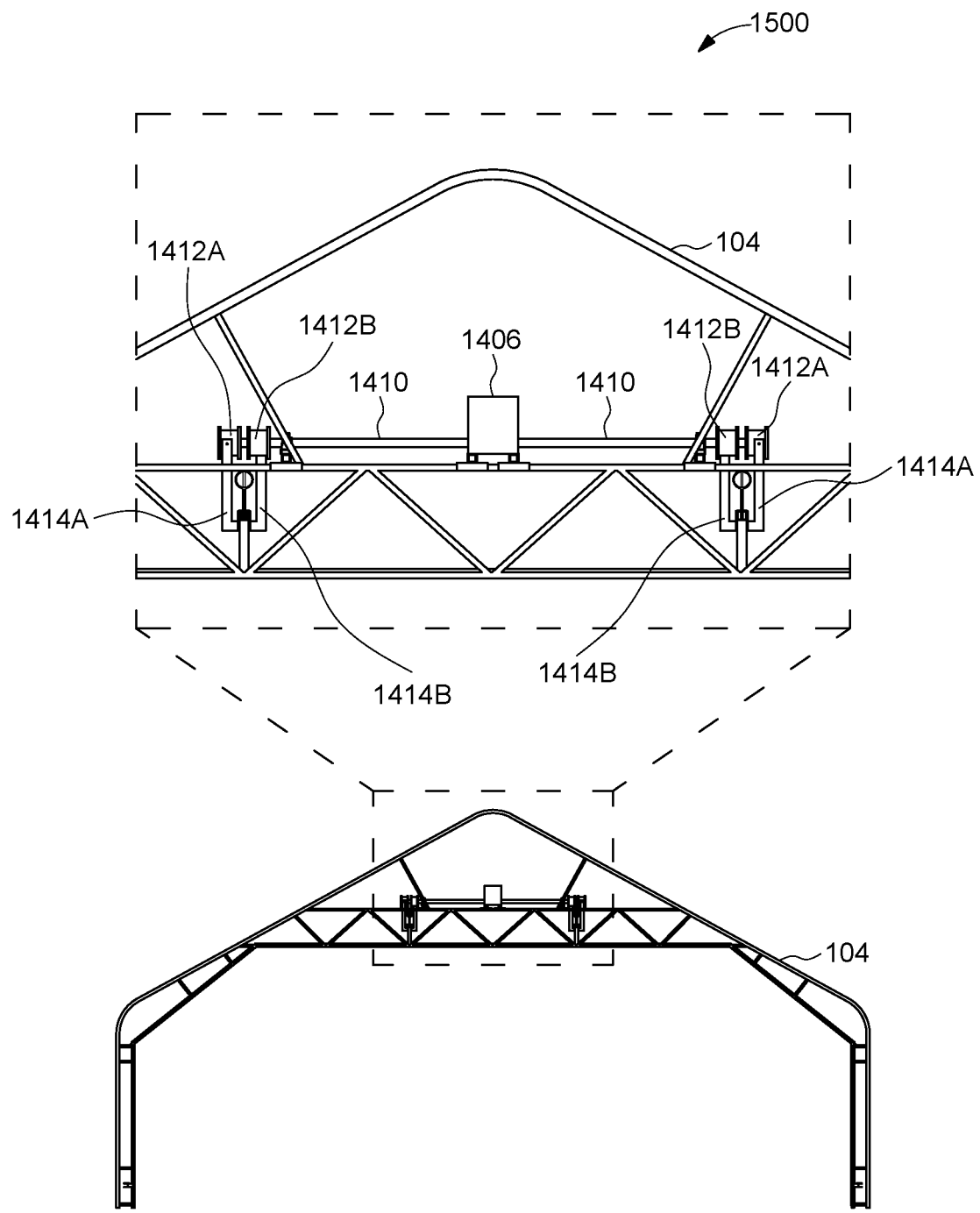
FIG. 15 illustrates a front view of a drive system, in accordance with an illustrative configuration of the present disclosure.
Figure 16:
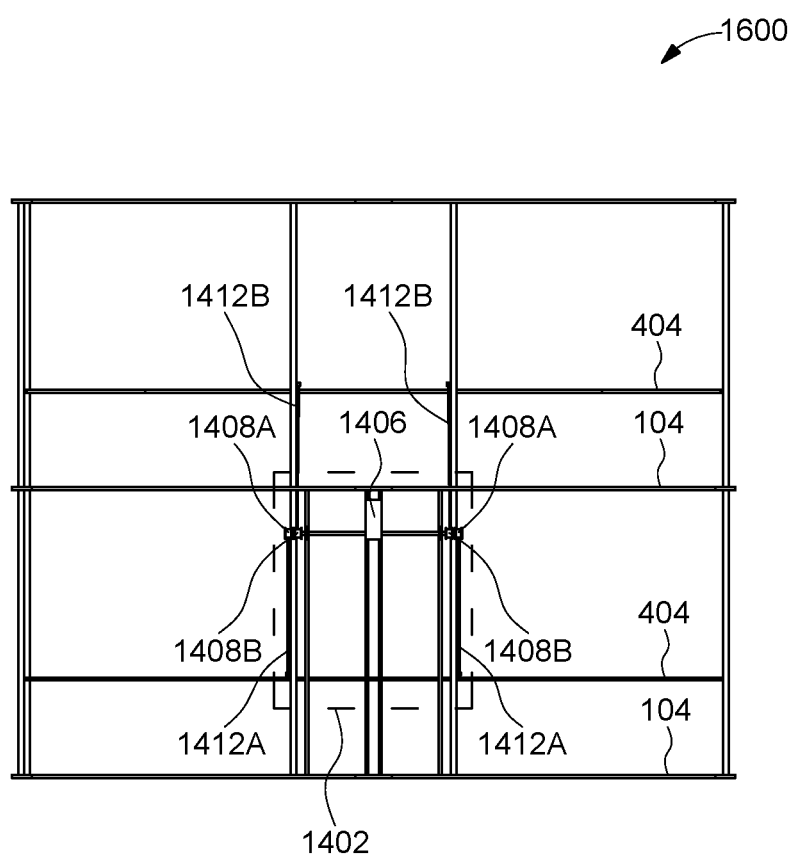
FIG. 16 illustrates a top view of a drive system, in accordance with an illustrative configuration of the present disclosure.

Referring now to FIGS. 14, 15, and 16 a perspective view 1400, a front view 1500, and a top view 1600 of the drive system 1402 are respectively illustrated, in accordance with a configuration of the present disclosure. As depicted in a close-up view 1404, the drive system 1402 may include a drive source 1406, which, for example, may be a garage door motor. The drive source 1406 is further explained in conjunction with FIGS. 15, 16, and 17. The drive source 1406 may include an electrical motor (not shown) that is connected to two pair of spools 1408 on either sides via shafts 1410. Thus, the drive system 1402 may include fours spools 1408, two on either side of the drive source 1406. Each pair of spools 1408 may include a spool 1408A and a spool 1408B. In some configurations, the spool 1408A may be on the outer side farther from the drive source 1406, while the spool 1408B may be on the inner side closer to the driver source 1406.

Each spool 1408 may be configured to have a drive cable 1412 attached thereon via a spring (not shown). The drive cables 1412 may be flexible. The spools 1408A may have the drive cables 1412A attached thereon, while the spools 1408B may have the drive cables 1412B attached thereon. It will be apparent that the drive cables 1412A and 1412B are same in make and functionality. Each of the drive cables 1412 is further attached to one of a plurality of brackets 1414. The plurality of brackets 1414 may be constructed using square or rectangular hollow section steel tubes, each of which may have specifications of 1.5 inch 14 gauge. The plurality of brackets 1414 may be attached to one of the plurality of drive rods 406, which are further attached to the plurality of gantries 404 via the plurality of arms 516.

By way of an example and referring back to FIG. 4, one or more of the plurality of brackets 1414 may be attached to the drive rods 406-2 and 406-4 by way of welding or other fastening means as explained before. The drive rods 406-2 and 406-4 are further connected to each of the plurality of gantries 404. As a result of this interconnection between the brackets 1414, one or more of the plurality of drive rods 406, and the plurality of gantries 404, any movement in the plurality of brackets 1414 is mimicked by the plurality of gantries 404 that move in tandem with the plurality of brackets 1414. In one configuration, the drive cables 1412A may be attached to brackets 1414A placed opposite a first end 1406A of the drive source 1406. In a similar manner, the drive cables 1412B may be attached to brackets 1414B placed opposite a second end 1406B (oppositely disposed from the first end) of the drive source 1406.

The drive source 1406 may draw power from a power supply within the greenhouse 102 (for example, via the pair of power sockets 1312 and the power plug 1314). The drive source 1406 may be activated manually or automatically based on temperature or other ambient environment characteristics measured by one or more meteorological sensor within the greenhouse 102. Other ambient environment characteristics may include, but are not limited to humidity, barometric pressure, and/or solar radiations. In some configurations, the one or more meteorological sensors may be placed at various distributed locations within the greenhouse 102.

The one or more meteorological sensors may be configured to generate a trigger to activate the drive source 1406. The trigger, for example, may be generated when the detected temperature is greater than or equal to a predetermined temperature. The trigger may be received by a controller (not shown) within the drive source 1406 and in response the controller may activate the drive source 1406. The controller may also be configured and programmed to remotely connect with the one or more meteorological sensors and any Internet of Things (IOT) enabled devices within the greenhouse 102 or outside through various wireless means. Moreover, a user may be able to connect with the controller and control the drive source 1406 from a remote location. In some configurations, a time base circuit may be configured to automatically send an activation signal to the controller to activate the drive source 1406 at specific times during the day.

Once the drive source 1406 is activated, the power is transferred to the shafts 1410 and further on to the pair of spools 1408 on either side of the drive source 1406. The drive source 1406 may be operated to transition the greenhouse 102 between the closed position (or the completely shaded state) and the open position (or the completely unshaded state) by deploying first and second activation modes. In one configuration, the first activation mode may lead to clockwise rotation of the pair of spools 1408 resulting in transition of the greenhouse 102 to the closed position or partially closed position. In contrast, the second activation mode may lead to anti-clockwise rotation of the pair of spools 1408 resulting in transition of the greenhouse 102 to the open position or partially open position. Thus, the drive source 1406 may be accordingly activated and operated based on the current requirement.

In some configurations, when the drive source 1406 is activated to operate in the first activation mode, the spools 1408A start rotating in a clockwise direction and start wrapping the drive cables 1412A around it with each rotation. This in turn pulls the brackets 1414A towards the first end 1406A of the drive source 1406. As a result of movement of the brackets 1414A, the drive rods 406 attached thereto and the plurality of gantries 404 start moving in the same direction as the brackets 1414A. In other words, the first edge 408A of the plurality of shades 408 moves farther from the second edge 408B of the plurality of shades 408, thereby transitioning the greenhouse 102 into the closed position (or the completely shaded state).

In a similar manner, when the drive source 1406 is activated to operate in the second activation mode, the spools 1408B start rotating in an anti-clockwise direction and start wrapping the drive cables 1412B around it with each rotation. This in turn pulls the brackets 1414B towards the second end 1406B of the drive source 1406. As a result of movement of the brackets 1414B, the drive rods 406 attached thereto and the plurality of gantries 404 start moving in the same direction as the brackets 1414B. In other words, the first edge 408A of the plurality of shades 408 moves closer to the second edge 408B of the plurality of shades 408, thereby transitioning the greenhouse 102 into the open state (or the completely unshaded state).

To prevent any damage that may be caused to the plurality of gantries 404 and/or the plurality of shades 408 during transitions between the closed and the open positions, the drive source 1406 may further include a fuse (not shown) that may be configured to decouple the drive source 1406 from the plurality of gantries 404. In some configurations, the fuse may include a mechanical clutch that may be actuated in response to partial or complete resistance of movement of one or more of the plurality of gantries 404. Upon being actuated, the mechanical clutch may decouple the drive source 1406 from the plurality of gantries 404. The mechanical clutch may, for example, may disengage the pair of spools 1408 from the shafts 1410 in order to decouple the drive source 1406. In some other configurations, to avoid any aforementioned damage, the fuse may further include a limiting circuit that may be coupled to a current sensor. Whenever a partial or complete resistance in movement of the plurality of gantries 404 is detected, the limiting circuit may disconnect electricity supply to the drive source 1406.

Figure 17:
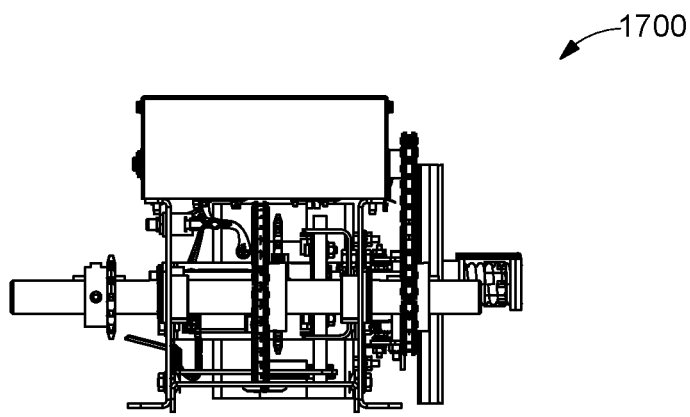
FIG. 17 illustrates a back view of a drive source, in accordance with an illustrative configuration of the present disclosure.
Figure 18:
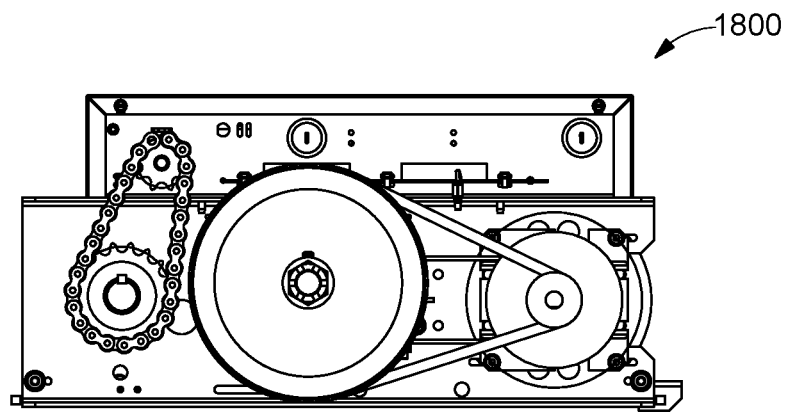
FIG. 18 illustrates a side view of a drive source, in accordance with an illustrative configuration of the present disclosure.
Figure 19:
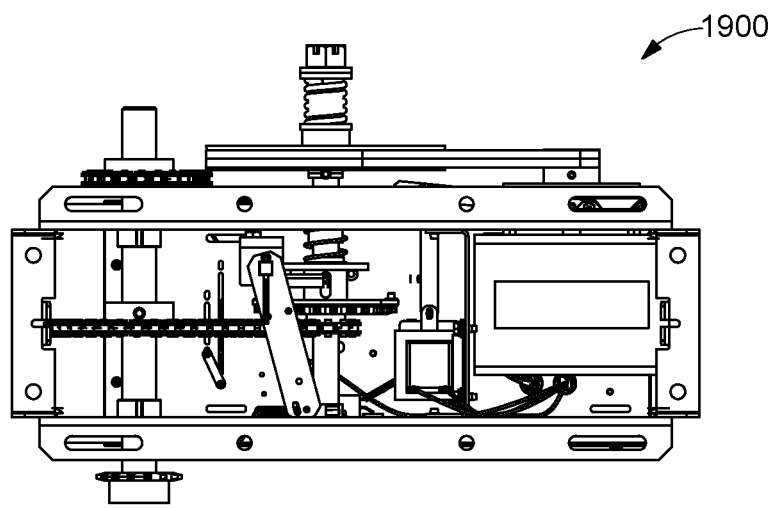
FIG. 19 illustrates a bottom view of a drive source, in accordance with an illustrative configuration of the present disclosure.

Referring now to FIGS. 17, 18, and 19, a back view 1700, a side view 1800, and a bottom view 1900 of the drive source 1406 are respectively illustrated, in accordance with some configurations of the present disclosure. In the current configuration, the drive source 1406 may be a medium-duty jackshaft operator as provide by LIFTMASTER®. The drive source 1406 in the current configuration may have a medium-rated duty cycle of up to 12 cycles/hour and up to 50 cycles/day using an intermittent-rated motor. The operator speed may be 8-9 inches per second. A floor-level emergency release sash chain may be provided for emergency disconnect for manual operation. When tension is removed from emergency release sash chain, the emergency disconnect may auto-reconnect. The drive source 1406 may use a solid-state medium-duty logic circuit board and the timer-to-close may be programmable from 5-60 seconds in 5-second increments. The drive source 1406 may include a mechanical clutch actuable to forces, such as a standard adjustable friction clutch that slips at a predetermined (or adjustable) torque/load/speed. The drive source 1406 may be provided with a three-button control station that may be mounted on the first end panel 118 for controlling operation of the motor. Further, a three push button station may also be provided, each of which may correspond to open, close, and stop respectively.

The drive source 1406 may include a 315 MHz radio receiver that may accept up to 23 security and remote controls and unlimited Dual In-Line Package (DIP) switch remote controls. The voltage connections may be single-phase and 115v and the control circuit may be 24V National Electronic Code (NEC) class 2. The drive reduction may be via first stage heavy duty 4L V-belt and the second and third stages via size #48 roller chain. The bearings and/or bushings may be heavy duty and oil filled and heavy-duty solenoid-actuated brakes may be used. The drive source 1406 may be constructed using National Electrical Manufacturers Association (NEMA) 1 type electrical box, a heavy-duty 11-gauge steel frame with baked on powder coat finish, while all reduction sprockets may be drilled and pinned to shafts.

Figure 20:
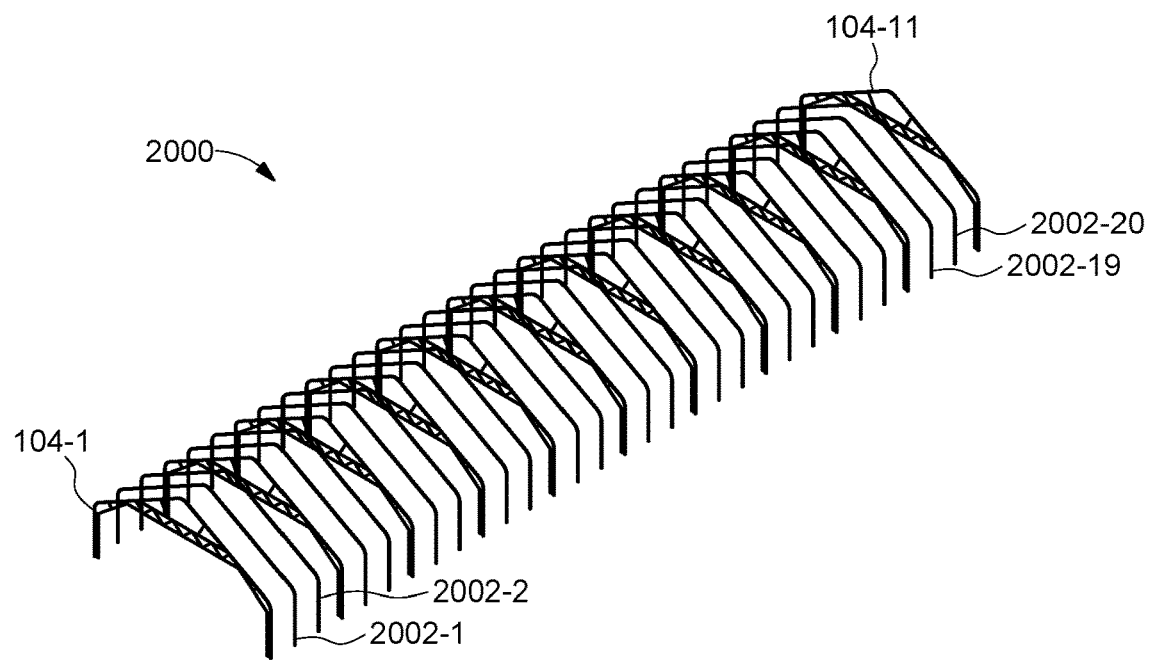
FIG. 20 illustrates a top perspective view of a greenhouse depicting a plurality of main trusses and a plurality of intermediate trusses, in accordance with an illustrative configuration of the present disclosure.

Referring now to FIG. 20, a top perspective view 2000 of the greenhouse 102 depicting the plurality of main trusses 104 and a plurality of intermediate trusses 2002 is illustrated, in accordance with a configuration of the present disclosure. In the current configuration, the greenhouse 102 is depicted to include twenty intermediate trusses 2002-1, 2002-2, ... 2002-20 (collectively or individually referred to as the plurality of intermediate trusses 2002). The zone between two adjacent main trusses 104 may include two intermediate trusses 2002. Like the plurality of main trusses 104, the plurality of intermediate trusses 2002 may also be made up of square or rectangular hollow section steel tubes, each of which may have specifications of 1.5 inch and 14 gauge. The plurality of intermediate trusses 2002 primarily assist in supporting the translucent cover placed on the outer periphery of the greenhouse 102. Referring back to FIG. 1, in each zone, the translucent cover is supported by two intermediate trusses 2002 in addition to the two main trusses 104.

Figure 21:
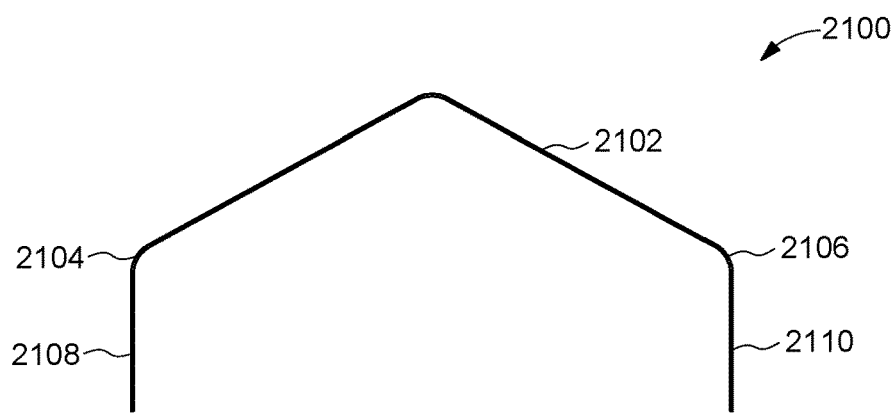
FIG. 21 illustrates a front view of an intermediate truss, in accordance with an illustrative configuration of the present disclosure.
Figure 22:
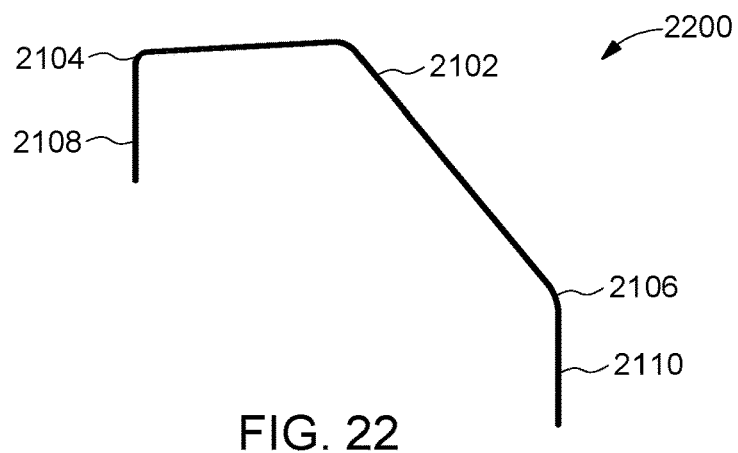
FIG. 22 illustrates a perspective view of an intermediate truss, in accordance with an illustrative configuration of the present disclosure.

Referring now to FIGS. 21 and 22, a front view 2100 and a perspective view 2200 of the intermediate truss 2002 are respectively illustrated, in accordance with a configuration of the present disclosure. The intermediate truss 2002 may include an overhead portion 2102 that defines a first end 2104 and a second end 2106 oppositely disposed from the first end 2104. A first post 2108 is formed on the first end 2104 of the overhead portion 2102 and a second post 2110 is formed on the second end 2106 of the overhead portion 2102. The second post 2110 is symmetrically formed to the first post 2108. The intermediary truss 2002 is rigidly erected on the ground via the first post 2108 and the second post 2110.

Figure 23:
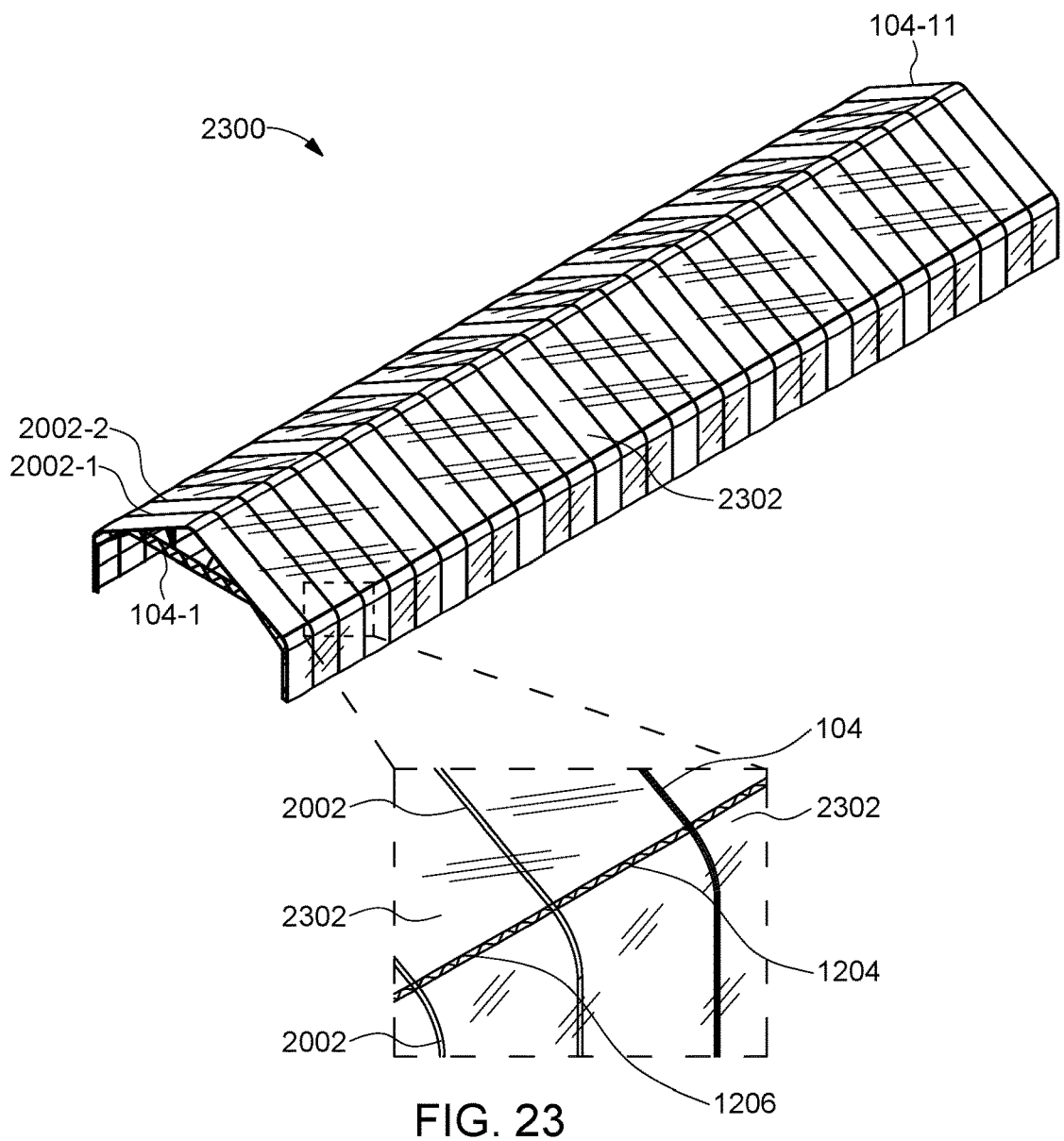
FIG. 23 illustrates a perspective view depicting a translucent cover placed along an outer periphery of a greenhouse, in accordance with an illustrative configuration of the present disclosure.

Referring now to FIG. 23, a perspective view 2300 depicting a translucent cover 2302 placed along the outer periphery of the greenhouse 102 is illustrated, in accordance with a configuration of the present disclosure. The translucent cover 2302 defines the interior space within the greenhouse 102 and is positioned along a periphery of and attached to the plurality of main trusses 104 to form an enclosure. The translucent cover 2302 may be transparent or translucent having a degree of opacity or tint. The material of the translucent cover 2302, for example, may include, but is not limited to polyethylene, ethyl vinyl acetate, and poly vinyl chloride. In some configurations, the translucent cover 2302 may be a double bubble sheet, which includes two layers of translucent sheets with air blown between the two layers using a blower fan. This is further explained in conjunction with FIG. 25.

As will be appreciated, the greenhouse 102 may provide a controlled environment of temperature, light, moisture, atmospheric air composition, etc. The translucent cover 2302 provides for controlling the environment inside the interior space by shielding it from external environment and various elements of nature. When a double bubble sheet is used, the air blown within the two translucent sheets further helps in increasing the insulation. The translucent cover 2302 may further control moisture and the air composition inside the interior space. The translucent cover 2302 may be affixed along the outer periphery of the greenhouse using the wiggle wire channel 1204 and the wiggle wire 1206. As will be apparent, multiple such wiggle wire channels 1204 may be placed along the outer periphery of the greenhouse 102. The wiggle wire channel 1204 may be directly attached to one or more of the plurality of main trusses 104. In an alternate configuration, a platform (for example, a wooden platform) may be affixed to the plurality of main trusses 104 on the outer periphery and the wiggle wire channel 1204 may be attached to the platform. In this case, the dimensions of the platform may be slightly larger than the wiggle wire channel 1204 in order to accommodate it.

Figure 24:
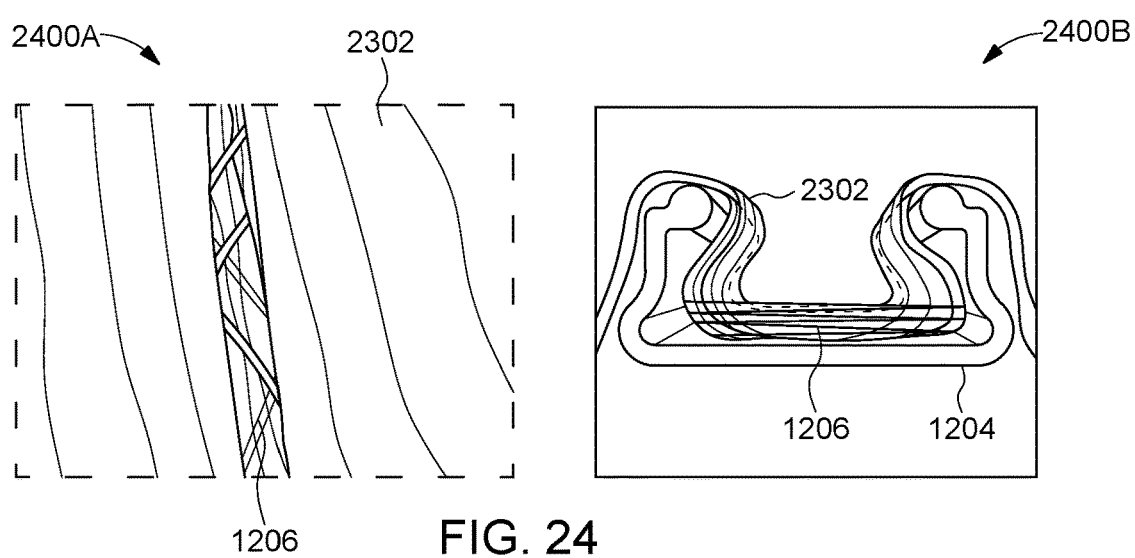
FIG. 24 illustrates a front view and a top perspective view of a wiggle wire channel and a wiggle wire trapping a translucent cover, in accordance with an illustrative configuration of the present disclosure.

Referring now to FIG. 24, a front view 2400A and a top perspective view 2400B of the wiggle wire channel 1204 and the wiggle wire 1206 trapping the translucent cover 2302 are illustrated, in accordance with a configuration of the present disclosure. In order to hold the translucent cover 2302 in place over the greenhouse 102 and to ensure that the air blown between the double bubble sheet stays trapped for a longer duration of time, the translucent cover 2302 is trapped using the wiggle wire channel 1204 and the wiggle wire 1206.

Figure 25:
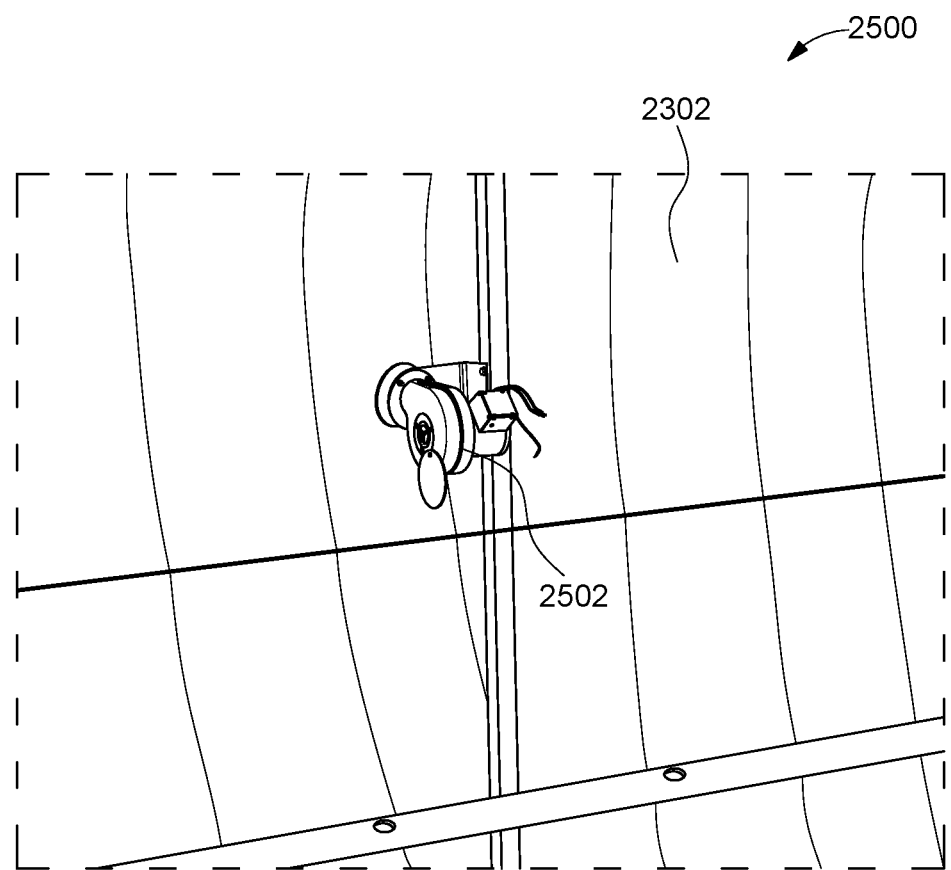
FIG. 25 illustrates a perspective view of a blower fan, in accordance with an illustrative configuration of the present disclosure.

Referring now to FIG. 25, a continuous flow of air is provided by one or more blower fans 2502, as depicted in a perspective view 2500 in FIG. 25. In some configurations, two 60 Cubic Feet per Minute (CFM) blower fans may be used that may be ran continuously and concurrently. In other configurations, two CFM blower fans may be used, such that, at a given time, only one of two CFM blower fans is used and ran continuously. The second one of the two CFM blower fans may be used only when the first CFM blower fan has stopped working.

Figure 26:
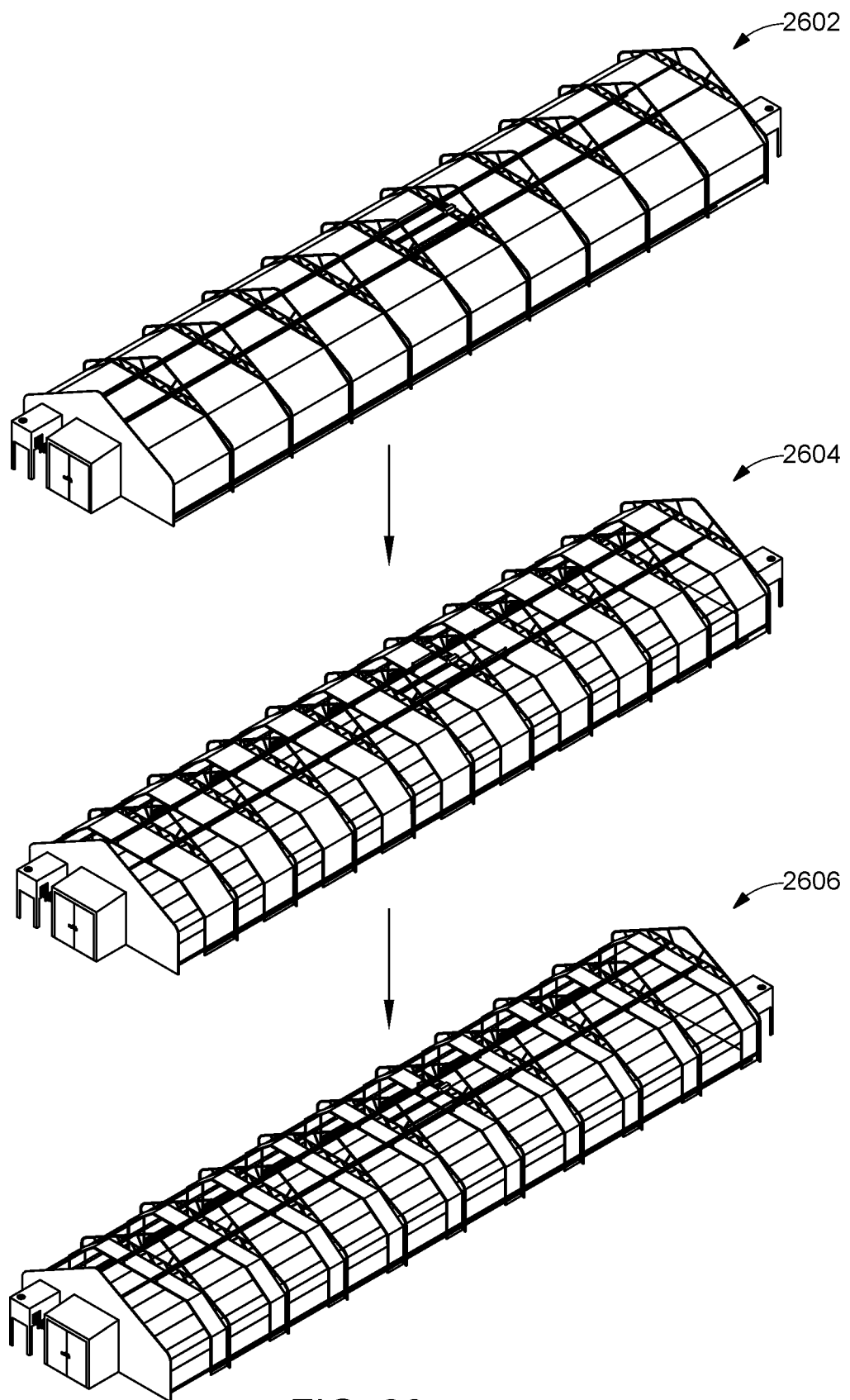
FIG. 26 illustrates top perspective views of a greenhouse transitioning from a completely shaded state to a completely unshaded state, in accordance with an illustrative configuration of the present disclosure.

Referring now to FIG. 26, top perspective views of the greenhouse 102 transitioning from the completely shaded state to the completely unshaded state are illustrated, in accordance with a configuration of the present disclosure. A top perspective view 2602 depicts the greenhouse 102 in the completely shaded state, where each of the plurality of shades 408 is completely open. As discussed before, in the completely shaded state, the natural light is completely blocked from entering the greenhouse 102. A top perspective view 2604 depicts the greenhouse 102 in the partially shaded state, where each of the plurality of shades 408 is partially opened. Lastly, a top perspective view 2606 depicts the greenhouse 102 in the completely unshaded state, where each of the plurality of shades 408 is completely curled. As discussed before, in the completely unshaded state the natural light is not blocked from entering the greenhouse 102.

Figure 27:
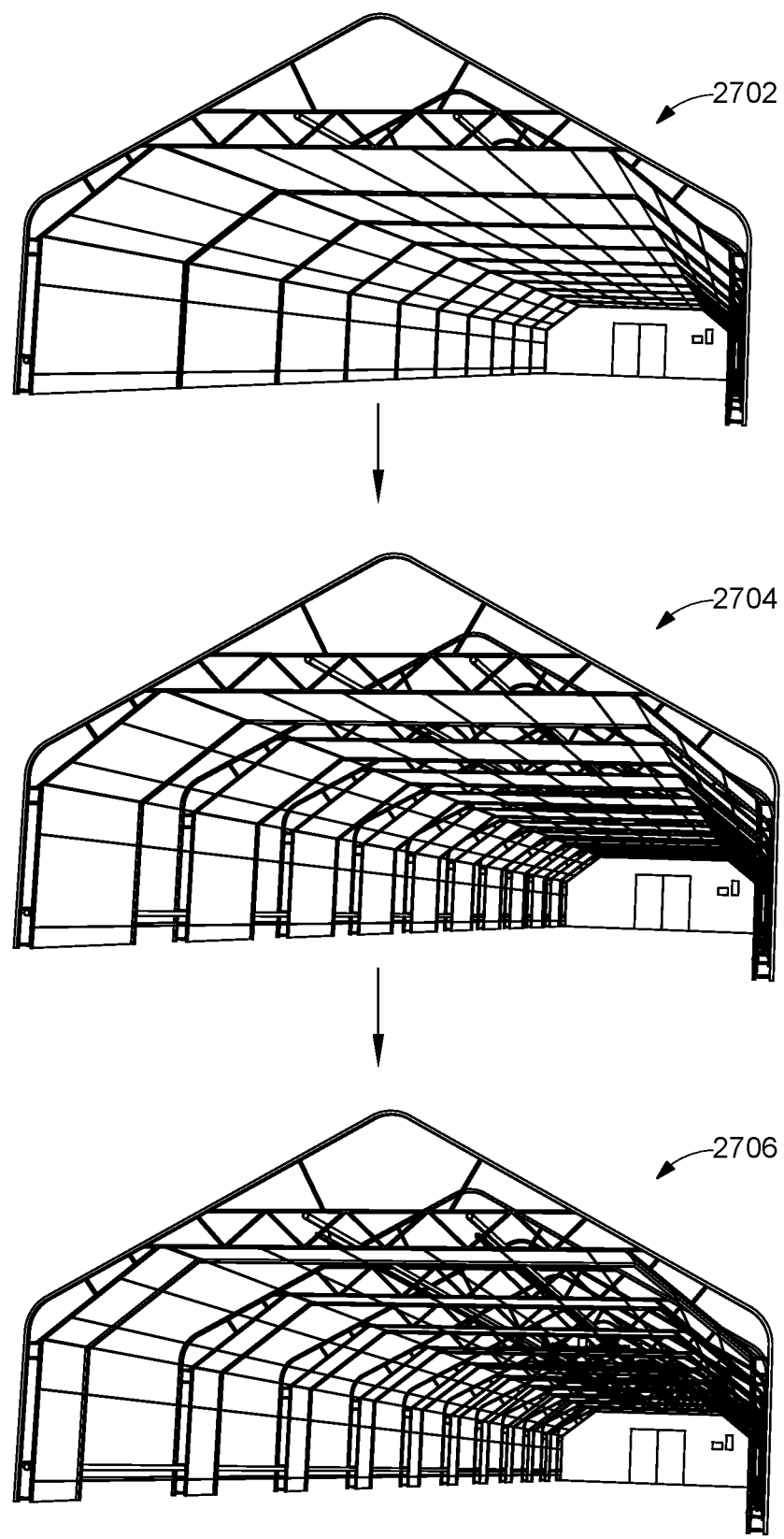
FIG. 27 illustrates front perspective views of a greenhouse transitioning from a completely shaded state to a completely unshaded state, in accordance with an illustrative configuration of the present disclosure.

Referring now to FIG. 27, front perspective views of the greenhouse 102 transitioning from the completely shaded state to the completely unshaded state are illustrated, in accordance with some configurations of the present disclosure. A front perspective view 2702 depicts the greenhouse 102 in the completely shaded state, where each of the plurality of shades 408 is completely open. A front perspective view 2704 depicts the greenhouse 102 in the partially shaded state, where each of the plurality of shades 408 is partially open. Lastly, a front perspective view 2706 depicts the greenhouse 102 in the completely unshaded state, where each of the plurality of shades 408 is completely curled.

Figure 28:
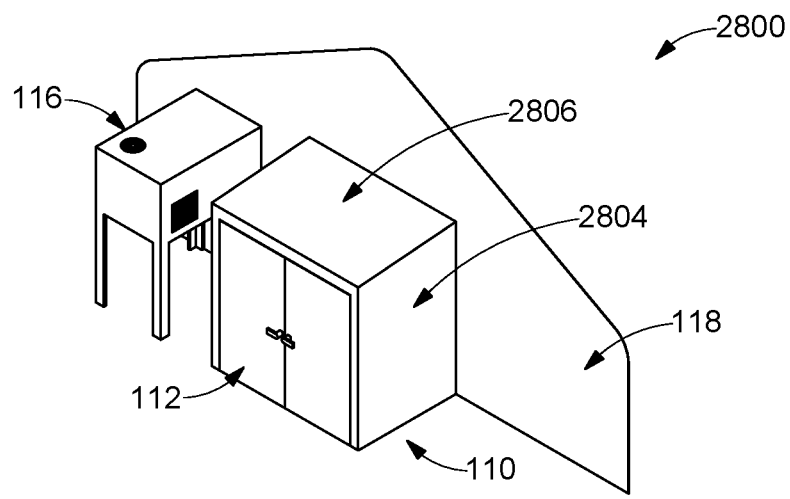
FIG. 28 illustrates a perspective view of an entry enclosure, in accordance with an illustrative configuration of the present disclosure.
Figure 29:
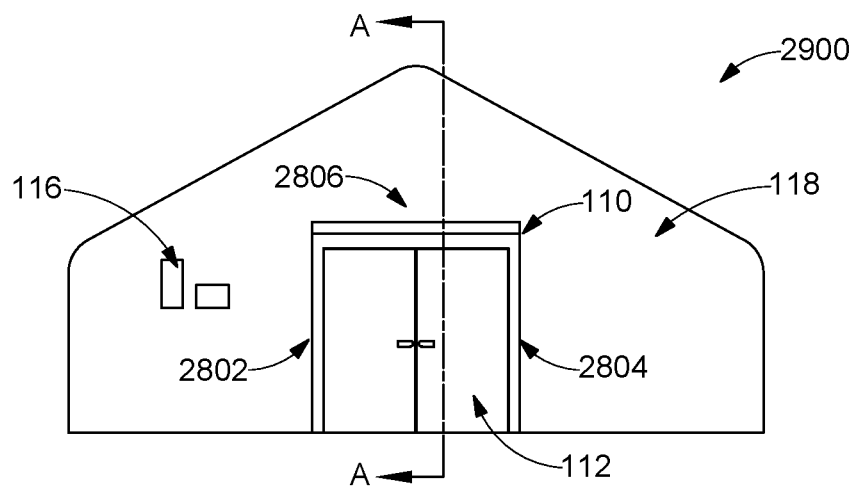
FIG. 29 illustrates a front view of an entry enclosure, in accordance with an illustrative configuration of the present disclosure.
Figure 30:
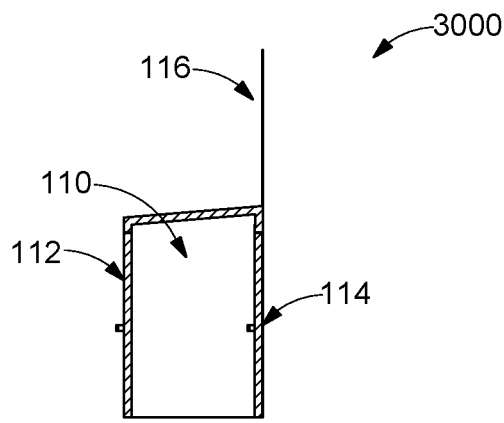
FIG. 30 illustrates a side cross-section view of an entry enclosure, in accordance with an illustrative configuration of the present disclosure.
Figure 31:
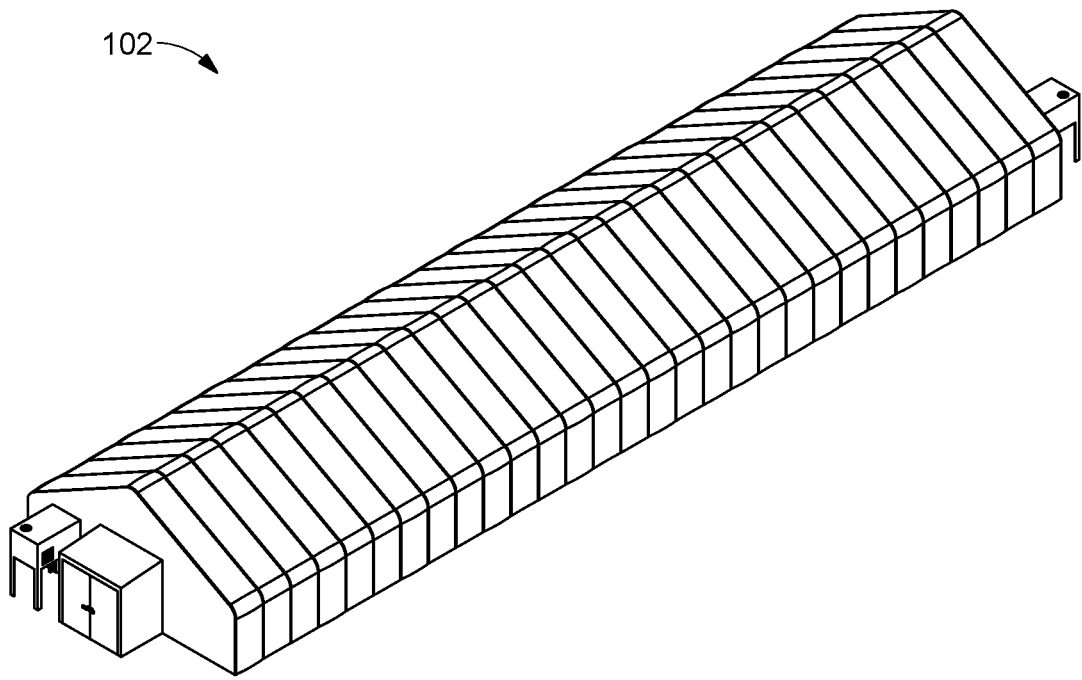
FIGS. 31-38 illustrate views (i.e., a perspective view, a left side view, a right side view, a top view, a bottom view, a front view, and a rear view, respectively) of an ornamental design of a greenhouse shade/shading system, in accordance with an illustrative configuration of the present disclosure; it is specifically noted that various elements of the illustrative views may be removed to broaden the scope of a claim (specifically for the ornamental appearance).
Figure 32:
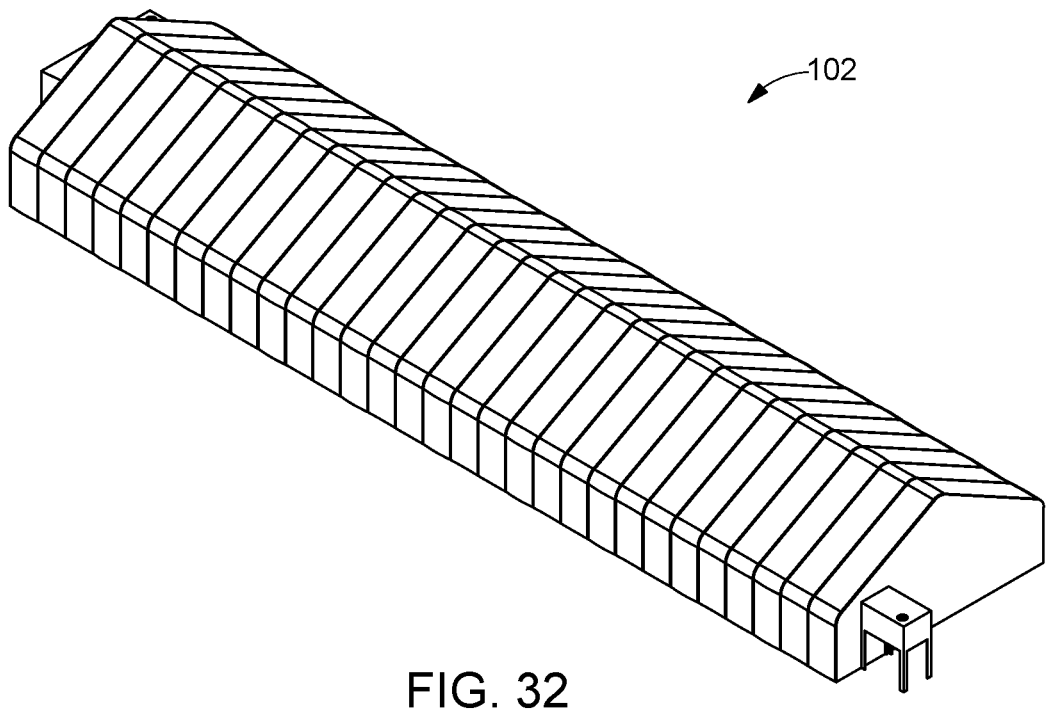
Figure 33:
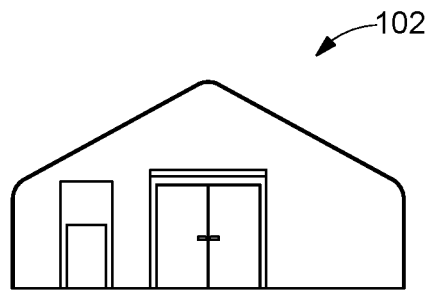
Figure 34:
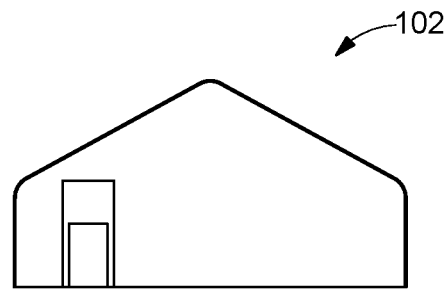
Figure 35:
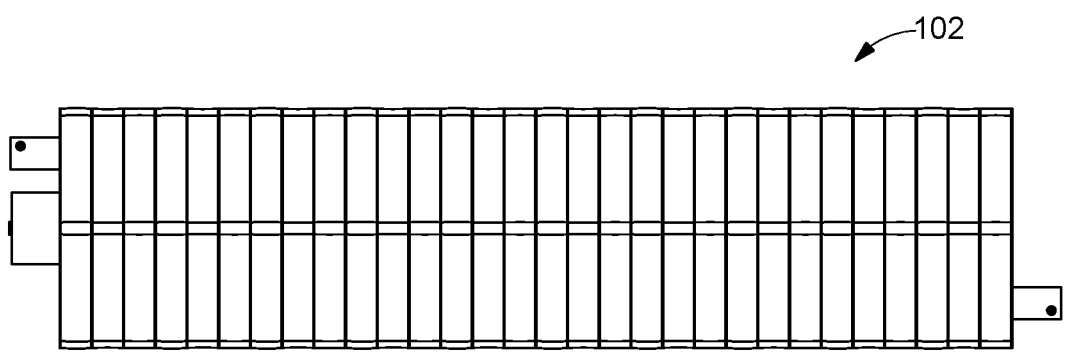
Figure 36:
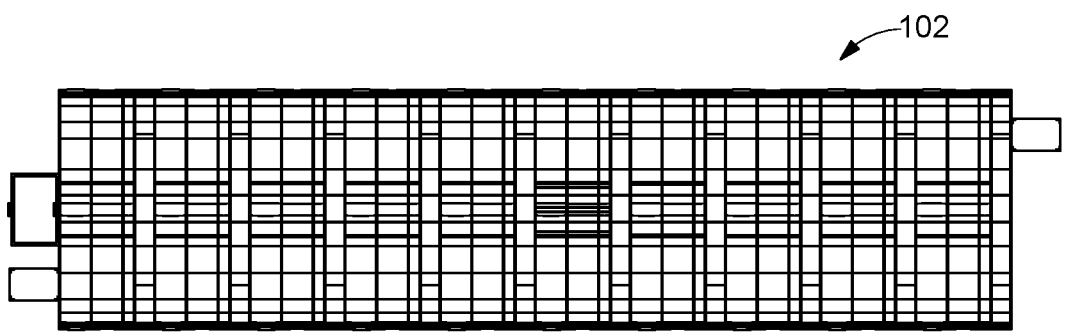
Figure 37:
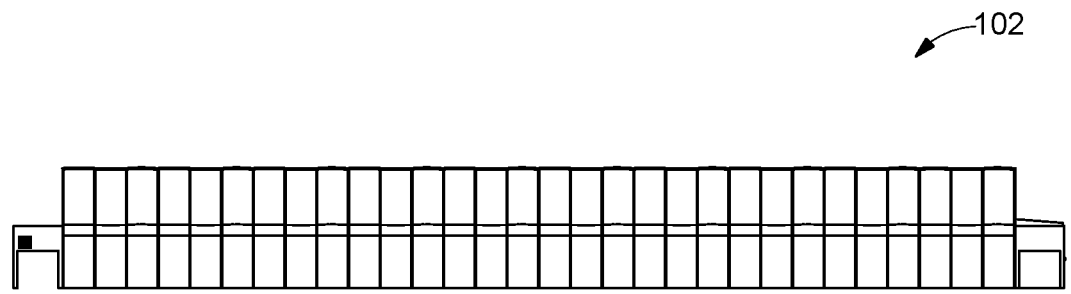
Figure 38:
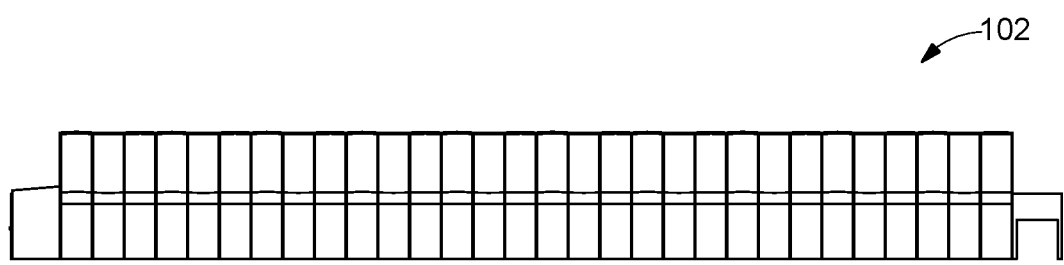

Referring now to FIGS. 28, 29, and 30, a perspective view 2800, a front view 2900, and a side cross-section view 3000 of the entry enclosure 110 are respectively illustrated, in accordance with a configuration of the present disclosure. The entry enclosure 110 may be formed on the first end panel 118. The entry enclosure 110 may include a shelter that may further include a first wall 2802 and a second wall 2804 parallel to and offset from the first wall 2802. The shelter further includes a roof 2806 attached to the first wall 2802, the second wall 2804, and the first end panel 118. The external doors 112 are movably attached to the entry enclosure 110, while the internal doors 114 that are parallel to and offset from the external doors 112 are movably attached to the first end panel 118 within a section cutout therefrom. Thus, the external doors 112, the internal doors 114, and the shelter define an entry space that is separate from the interior space defined by the translucent cover 2302 within the greenhouse 102.

The external doors 112 and the internal doors 114 may be used by people to enter and access the greenhouse 102. These doors may also be used to bring in machinery, tractors, and/or other equipment inside the greenhouse 102. In some configurations, the dimensions of the each of the external doors 112 and the internal doors 114 may be "4 feet×8 feet." Thus, when the doors 112 and 114 are completely open, an opening of dimensions "8 feet×8 feet" may be available for ingress to and egress from the greenhouse 102. Further, the provision of the external doors 112 and the internal doors 114 ensures that the ambient environment within the greenhouse 102 is not directly exposed to the outside environment, whenever someone wants to enter or access the greenhouse 102. As a result, the entry enclosure 110 helps in consistently maintaining the ambient environment within the greenhouse 102 even when it is being accessed by personnel.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The methods, systems, devices, graphs, and/or tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A greenhouse comprising:
 a plurality of main trusses, wherein each of the plurality of main trusses comprises:
  an overhead portion defining a first end and a second end oppositely disposed from the first end;
  a first post formed on the first end of the overhead portion;
  a second post formed on the second end of the overhead portion, the second post symmetrically formed to the first post;
  wherein each of the plurality of main trusses is rigidly erected on ground via the first post and the second post; and wherein the plurality of main trusses are aligned along a path;
a translucent cover positioned along a periphery of, and attached to, the plurality of main trusses to form an enclosure, the translucent cover defining an interior space;
a plurality of tracks attached to the plurality of main trusses along the path defined by the plurality of main trusses;
wherein the plurality of tracks are aligned with the path defined by the plurality of main trusses;
a plurality of gantries positioned within the interior space, wherein each of the plurality of gantries comprises:
an inverted U-shape frame comprising:
a web defining a first end and a second end oppositely disposed from the first end;
a first leg formed on the first end of the web; and
a second leg formed on the second end of the web and symmetrical to the first leg;
wherein the web, the first leg, and the second leg define a gantry plane perpendicular to the path defined by the plurality of main trusses;
a plurality of drive rods connecting the plurality of gantries together, with each of the plurality of gantries parallel to the other of the plurality of gantries;
a plurality of trolleys fixedly attached to the plurality of drive rods and slidingly engaged with the plurality of tracks, wherein the plurality of gantries are configured to move along the plurality of tracks via the plurality of trolleys;
a plurality of shades, each of the plurality of shades comprising:
a first edge attached to a gantry of the plurality of gantries; and
a second edge oppositely disposed from the first edge, the second edge attached to a main truss of the plurality of main trusses;
a drive system comprising:
a drive source coupled to one of the plurality of gantries, or the at least one of the plurality of drive rods, or the plurality of trolleys; and
wherein the drive source is configured to cause movement of the plurality of gantries between a first position and a second position when the drive source is operably coupled to the one of the plurality of gantries; and
wherein, in response to movement of the plurality of gantries between the second position and the first position, the first edge of at least one shade is configured to move relative to the second edge.

2. The greenhouse of claim 1, wherein the plurality of tracks comprise:
a bottom left track;
a top left track;
a bottom right track; and
a top right track;
wherein each of the plurality of gantries is configured to engage with each of the bottom left track, the top left track, the bottom right track, and the top right track; and
wherein each of the bottom left track, the top left track, the bottom right track, and the top right track is configured to enable and guide movement of the plurality of gantries.

3. The greenhouse of claim 2, wherein each of the plurality of tracks further comprising:
a hollow profile;
a groove along its length; and wherein each of the plurality of gantries is configured to engage with each of the bottom left track, the top left track, the bottom right track, and the top right track, via the plurality of trolleys; and
wherein each of the plurality of trolleys is configured to slidingly move within the hollow profile.

4. The greenhouse of claim 3, wherein each of the plurality of trolleys comprises:
a set of rolling members;
wherein the set of rolling members is configured to be disposed within the hollow profile of the plurality of tracks.

5. The greenhouse of claim 1 further comprising:
an intermediary truss positioned between a pair of adjacent main trusses of the plurality of main trusses, the intermediary truss comprising:
an overhead portion defining a first end and a second end oppositely disposed from the first end;
a first intermediary post formed on the first end of the overhead portion;
a second intermediary post formed on the second end of the overhead portion, the second intermediary post symmetrically formed to the first intermediary post;
wherein the intermediary truss is rigidly erected on ground via the first intermediary post and the second intermediary post; and
wherein the intermediary truss contacts and supports the translucent cover.

6. The greenhouse of claim 1 and further comprising:
a first end panel attached to one of the plurality of main trusses;
a second end panel attached to one of the plurality of main trusses oppositely disposed from the first end panel;
an entry enclosure formed on the first end panel, the entry enclosure comprising:
a shelter comprising:
a first wall;
a second wall parallel to, and offset from, the first wall;
a roof attached to the first wall, the second wall and the first end panel;
a first door movably attached to the first end panel;
a second door parallel to, and offset from, the first door, wherein the second door is movably attached to the entry enclosure;
wherein the first door, the second door, and the shelter define an entry space, wherein the entry space is separate from the interior space defined by the translucent cover.

7. The greenhouse of claim 1, wherein the drive system further comprises:
an electrical motor;
a fuse configured to decouple the drive source from the one of the plurality of gantries, wherein the fuse comprises at least one of:
a mechanical clutch actuable by partial or complete resistance of gantry movement, wherein upon being actuated, the mechanical clutch is to decouple the drive source from the one of the plurality of gantries; and
a limiting circuit coupled to a current sensor, wherein upon detection of partial or complete resistance of gantry movement, the limiting circuit disconnects electricity supply to the drive source.

8. The greenhouse of claim 1, further comprising:
a meteorological sensor configured to detect temperature within the greenhouse;

wherein the meteorological sensor is coupled to the drive source; and wherein the meteorological sensor is configured to generate a trigger to cause the drive source to cause movement of the plurality of gantries between the first position and the second position, based on the detected temperature and a predetermined temperature.

9. The greenhouse of claim 1, wherein the drive system further comprises:
at least one flexible drive cable; and
wherein the drive source is coupled to one of the plurality of gantries, or the at least one drive rod, or the plurality of trolleys, via the at least one flexible drive cable.

10. A shade system for a greenhouse structure, the shade system comprising:
a plurality of tracks configured to attach to the greenhouse structure;
wherein the greenhouse structure defines an interior space;
a plurality of gantries configured to be positioned within the interior space, wherein each of the plurality of gantries comprises:
an inverted U-shape frame comprising:
a web defining a first end and a second end oppositely disposed from the first end;
a first leg formed on the first end of the web; and
a second leg formed on the second end of the web and symmetrical to the first leg;
wherein the web, the first leg, and the second leg define a gantry plane;
a plurality of drive rods connecting the plurality of gantries together;
a plurality of trolleys fixedly attached to the plurality of drive rods and slidingly engaged with the plurality of tracks, wherein the plurality of gantries are configured to move along the plurality of tracks via the plurality of trolleys;
a plurality of shades, each of the plurality of shades comprising:
a first edge configured to attach to a gantry of the plurality of gantries; and
a second edge oppositely disposed from the first edge, the second edge attached to the structure of the greenhouse;
a drive system comprising:
a drive source coupled to one of the plurality of gantries, or the at least one drive rod, or the plurality of trolleys;
wherein the drive source is configured to cause movement of the plurality of gantries between a first position and a second position when the drive source is operably coupled to the one of the plurality of gantries; and
wherein, in response to movement of the plurality of gantries between the second position and the first position, the first edge of at least one shade is configured to move relative to the second edge.

11. The shade system of claim 10, wherein the plurality of tracks comprise:
a bottom left track;
a top left track;
a bottom right track; and
a top right track;
wherein each of the plurality of gantries is configured to engage with each of the bottom left track, the top left track, the bottom right track, and the top right track; and wherein each of the bottom left track, the top left track, the bottom right track, and the top right track is configured to enable and guide movement of the plurality of gantries.

12. The shade system of claim 11, wherein each of the plurality of tracks further comprising:
a hollow profile;
a groove along its length; and
wherein each of the plurality of gantries is configured to engage with each of the bottom left track, the top left track, the bottom right track, and the top right track, via the plurality of trolleys; and
wherein each of the plurality of trolleys is configured to slidingly move within the hollow profile.

13. The shade system of claim 12, wherein each of the plurality of trolleys comprises:
a set of rolling members;
wherein the set of rolling members is configured to be disposed within the hollow profile of the plurality of tracks.

14. The shade system of claim 10, wherein the drive system further comprises:
an electrical motor;
a fuse configured to decouple the drive source from the one of the plurality of gantries, wherein the fuse comprises at least one of:
a mechanical clutch actuable by partial or complete resistance of gantry movement, wherein upon being actuated, the mechanical clutch is to decouple the drive source from the one of the plurality of gantries; and
a limiting circuit coupled to a current sensor, wherein upon detection of partial or complete resistance of gantry movement, the limiting circuit disconnects electricity supply to the drive source.

15. The shade system of claim 10, further comprising:
a meteorological sensor configured to detect temperature within the greenhouse structure;
wherein the meteorological sensor is coupled to the drive source; and
wherein the meteorological sensor is configured to generate a trigger to cause the drive source to cause movement of the plurality of gantries between the first position and the second position, based on detect temperature and a predetermined temperature.

16. The shade system of claim 10, wherein the drive system further comprises:
at least one flexible drive cable; and
wherein the drive source is coupled to one of the plurality of gantries, or the at least one drive rod, or the plurality of trolleys, via the at least one flexible drive cable.

17. A method of shading a greenhouse structure comprising:
attaching a plurality of tracks to the greenhouse structure, wherein the greenhouse structure defines an interior space;
positioning a plurality of gantries within the interior space, wherein each of the plurality of gantries comprises:
an inverted U-shape frame comprising:
a web defining a first end and a second end oppositely disposed from the first end;
a first leg formed on the first end of the web; and
a second leg formed on the second end of the web and symmetrical to the first leg;
wherein the web, the first leg, and the second leg define a gantry plane;

connecting the plurality of gantries together by a plurality of drive rods;
slidingly engaging, with the plurality of tracks, a plurality of trolleys fixedly attached to the plurality of drive rods, wherein the plurality of gantries are configured to move along the plurality of tracks via the plurality of trolleys;
providing a plurality of shades, wherein each of the plurality of shades comprises:
  a first edge; and
  a second edge oppositely disposed from the first edge;
wherein providing the plurality of shades comprises:
  attaching the first edge to a gantry of the plurality of gantries; and
  attaching the second edge to the greenhouse structure;
providing a drive system, wherein the drive system comprises:
  a drive source coupled to one of the plurality of gantries, or the at least one drive rod, or the plurality of trolleys; and
triggering the drive system to cause movement of the plurality of gantries between a first position and a second position when the drive source is operably coupled to the one of the plurality of gantries;
wherein, in response to the movement of the plurality of gantries between the second position and the first position, the first edge of at least one shade moves relative to the second edge.

18. The method of claim 17, further comprising:
decoupling the drive source from the one of the plurality of gantries, wherein the decoupling comprises at least one of:
  actuating a mechanical clutch by partial or complete resistance of gantry movement, wherein upon being actuated, the mechanical clutch is to decouple the drive source from the one of the plurality of gantries; and
  disconnecting electricity supply to the drive source using a limiting circuit coupled to a current sensor, upon detection of partial or complete resistance of gantry movement.

19. The method of claim 17, further comprising:
detecting, by a meteorological sensor, temperature within the greenhouse structure;
wherein the meteorological sensor is coupled to the drive source; and
generating, by the meteorological sensor, a trigger to cause the drive source to cause movement of the plurality of gantries between the first position and the second position, based on the detected temperature and a predetermined temperature.

20. A greenhouse comprising:
a plurality of main trusses, wherein each of the plurality of main trusses comprises:
  an overhead portion defining a first end and a second end oppositely disposed from the first end;
  a first post formed on the first end of the overhead portion;
  a second post formed on the second end of the overhead portion, the second post symmetrically formed to the first post;
  wherein each of the plurality of main trusses is rigidly erected on ground via the first post and the second post; and
  wherein the plurality of main trusses are aligned along a path;
a translucent cover positioned along a periphery of, and attached to, the plurality of main trusses to form an enclosure, the translucent cover defining an interior space;
a plurality of tracks attached to the plurality of main trusses along the path defined by the plurality of main trusses;
wherein the plurality of tracks are aligned with the path defined by the plurality of main trusses;
a plurality of gantries positioned within the interior space, wherein each of the plurality of gantries comprises:
  an inverted U-shape frame comprising:
    a web defining a first end and a second end oppositely disposed from the first end;
    a first leg formed on the first end of the web; and
    a second leg formed on the second end of the web and symmetrical to the first leg;
    wherein the web, the first leg, and the second leg define a gantry plane perpendicular to the path defined by the plurality of main trusses;
a plurality of drive rods connecting the plurality of gantries together with the gantry plane of each of the plurality of gantries parallel to the other gantry planes of the plurality of gantries;
a plurality of trolleys fixedly attached to either the plurality of gantries or the plurality of main trusses and slidingly engaged with the plurality of tracks or the plurality of drive rods, wherein the plurality of gantries are configured to move relative to the plurality of main trusses via the plurality of trolleys;
a plurality of shades, each of the plurality of shades comprising:
  a first edge attached to a gantry of the plurality of gantries; and
  a second edge oppositely disposed from the first edge, the second edge attached to a main truss of the plurality of main trusses;
a drive system comprising:
  a drive source coupled to one of the plurality of gantries, or the at least one drive rod, or the plurality of trolleys; and
  wherein the drive source is configured to cause movement of the plurality of gantries between a first position and a second position when the drive source is operably coupled to the one of the plurality of gantries; and
wherein, in response to movement of the plurality of gantries between the second position and the first position, the first edge of at least one shade is configured to move relative to the second edge.

* * * * *